US010481565B2

(12) United States Patent
Crncich-DeWolf et al.

(10) Patent No.: US 10,481,565 B2
(45) Date of Patent: Nov. 19, 2019

(54) METHODS AND SYSTEMS FOR NONLINEAR ADAPTIVE CONTROL AND FILTERING

(71) Applicant: Applied Brain Research Inc., Waterloo (CA)

(72) Inventors: Travis Crncich-DeWolf, Waterloo (CA); Terrence Charles Stewart, Waterloo (CA); Jean-Jacques Emile Slotine, Boston, MA (US); Christopher David Eliasmith, Waterloo (CA)

(73) Assignee: Applied Brain Research Inc., Waterloo (CA)

( * ) Notice: Subject to any disclaimer, the term of this patent is extended or adjusted under 35 U.S.C. 154(b) by 513 days.

(21) Appl. No.: 14/937,191

(22) Filed: Nov. 10, 2015

(65) Prior Publication Data
US 2016/0147201 A1    May 26, 2016

Related U.S. Application Data

(60) Provisional application No. 62/078,047, filed on Nov. 11, 2014.

(51) Int. Cl.
*G06N 3/04* (2006.01)
*G05B 13/02* (2006.01)
*G06N 3/08* (2006.01)
*G06N 3/063* (2006.01)

(52) U.S. Cl.
CPC ......... *G05B 13/0265* (2013.01); *G06N 3/049* (2013.01); *G06N 3/08* (2013.01); *G05B 2219/41152* (2013.01); *G06N 3/063* (2013.01)

(58) Field of Classification Search
CPC .................................................... G05B 13/02
See application file for complete search history.

(56) References Cited

U.S. PATENT DOCUMENTS

| 5,268,834 | A | 12/1993 | Sanner et al. |
| 9,020,870 | B1 * | 4/2015 | Daily ............... G06N 3/049 |
| | | | 706/20 |
| 9,346,167 | B2 * | 5/2016 | O'Connor ......... G06N 3/008 |

(Continued)

OTHER PUBLICATIONS

Stewart, Terrence C., "A Technical Overview of the Neural Engineering Framework", Centre for Theoretical Neuroscience technical report, Oct. 29, 2012.

(Continued)

*Primary Examiner* — Thomas C Lee
*Assistant Examiner* — Gary Collins
(74) *Attorney, Agent, or Firm* — Bereskin & Parr LLP/S.E.N.C.R.L., s.r.l.

(57) ABSTRACT

Methods, systems and methods for designing a system that provides adaptive control and adaptive predictive filtering using nonlinear components. A system design is described that provides an engineered architecture. This architecture defines a core set of network dynamics that carry out specific functions related to control or prediction. The adaptation systems and methods can be applied to limited areas of the system to allow the system to learn to compensate for unmodeled system dynamics and kinematics. Two types of adaptive modules are described which are configured to account for the unmodeled system dynamics and kinematics.

42 Claims, 10 Drawing Sheets

(56) References Cited

U.S. PATENT DOCUMENTS

| | | | | |
|---|---|---|---|---|
| 2006/0235477 | A1* | 10/2006 | Rom | A61N 1/36514 607/9 |
| 2013/0325774 | A1* | 12/2013 | Sinyavskiy | G06N 3/049 706/23 |
| 2013/0325776 | A1* | 12/2013 | Ponulak | G06N 3/08 706/25 |
| 2014/0277718 | A1* | 9/2014 | Izhikevich | B25J 9/163 700/250 |

OTHER PUBLICATIONS

Wilson et al., "A Neural Implementation of the Kalman Filter", Advances in neural information processing systems, 2009, pp. 2062-2070.

Cheah et al., "Adaptive tracking control for robots with unknown kinematic and synamic properties." The International Journal of Robotics Research 25.3, 2006.

Merolla et al., "A million spiking-neuron integrated circuit with a scalable communication network and interface." Science 345.6197, Aug. 8, 2014, vol. 345/Issue 6197, pp. 668-673. Available: www.sciencemag.org.

Menon et al., "Controlling articulated robots in task-space with spiking silicon neurons." Biomedical Robotics and Biomechatronics, IEEE RAS & EMBS International Conference, Aug. 2014, pp. 181-186.

Furber et al., "Neural systems engineering." Journal of the Royal Society Interface 4, No. 13, 2007, pp. 193-209.

Eliasmith et al., "How to build a brian: A neural architecture for biological cognition", May 16, 2013, Oxford University Press.

Benjamin et al., "Neurogrid: A mixed-analog-digital culticap system for large-scale neural stimulations." Proceedings of the IEEE, vol. 102, No. 5, May 2014 pp. 699-716.

* cited by examiner

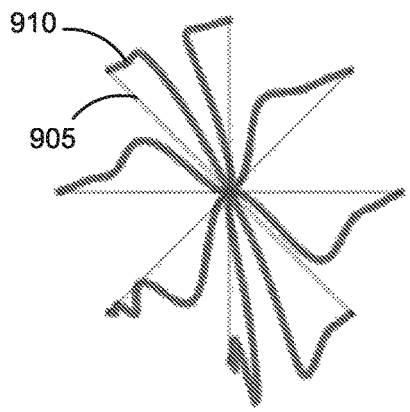
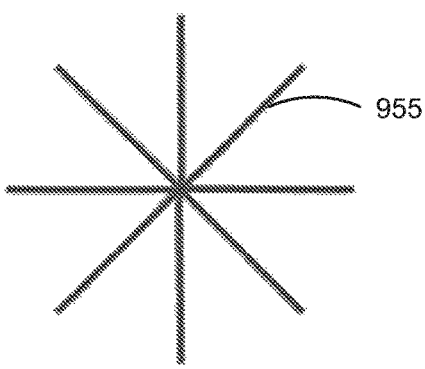
FIG. 9A     FIG. 9B
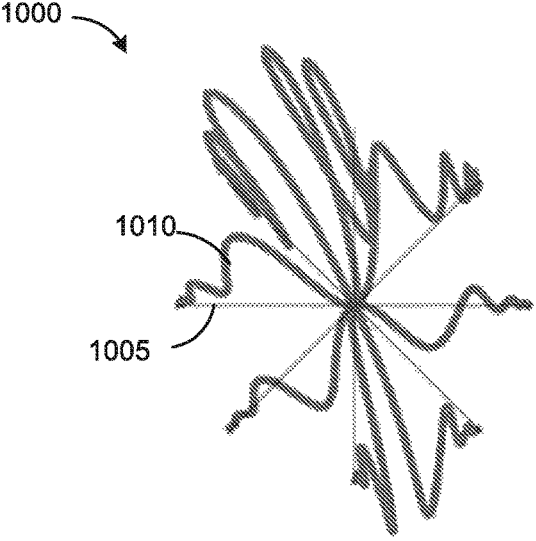
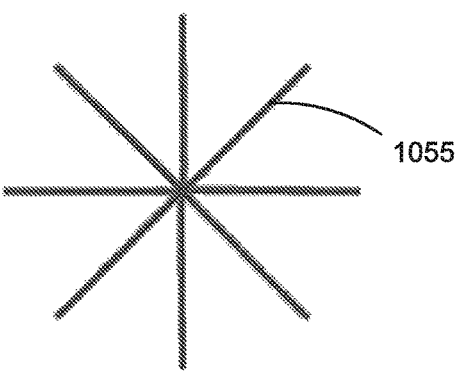
FIG. 10A     FIG. 10B

METHODS AND SYSTEMS FOR NONLINEAR ADAPTIVE CONTROL AND FILTERING

CROSS-REFERENCE TO RELATED APPLICATIONS

This application claims the benefits of U.S. Provisional Application No. 62/078,047, entitled "METHODS AND SYSTEMS FOR NONLINEAR ADAPTIVE CONTROL AND FILTERING", filed Nov. 11, 2014. The entire content of U.S. Provisional Application No. 62/078,047 is hereby incorporated by reference.

FIELD

The system and methods described herein are generally directed to providing adaptive control and predictive filtering in distributed systems using nonlinear adaptive components.

BACKGROUND

The dynamics of a system determine how the system moves in response to internal or external forces applied in different states. Effective control of a system is dependent on having an accurate model of the system's dynamics. Effective predictive filtering is similarly dependent on having an accurate model of the dynamics of the system under observation.

An accurate model of system dynamics is able to capture how different perturbations affect the system. This model should also capture how internal dynamics, such as the inertia between coupled components, cause the system to move. The model can be used to generate control signals to move the system in a desired way and/or prediction signals to predict a future state of a system under observation.

Effective control or predictive filtering also requires a system model that is able to effectively account for kinematic changes in the system. For example, when a robotic arm manipulates an objects of unknown dimensions or at an unknown gripping point, the overall kinematics and dynamics of the robotic arm change. Similarly, when parameters of the system change, for example due to degradation over time, the dynamics and possibly the kinematics of the system will change. A system model that is able to automatically and effectively account for changes in both kinematics and dynamics will provide more accurate control and prediction for a broader range of systems.

Effective adaptive control and predictive filtering in systems becomes increasingly complex as the degrees of freedom in the system increase. The complexity of the models needed to account for system dynamics increases with the dimensions of the system. Nonlinear models have great potential for accurately modelling a system, but are also more complicated to develop.

Previous approaches to nonlinear adaptation use nonlinear components that give multidimensional outputs, for which there is a single coefficient that is learned. This approach is subject to the curse of dimensionality for high degree of freedom systems, as the number of bases required to tile the state space increases exponentially with the degrees of freedom of the system. These methods also cannot be directly applied using hardware components that communicate using scalar outputs. A system design that is able to provide effective adaptive control and predictive filtering and can scale to higher degrees of freedom would be beneficial. Such a design could provide more efficient implementations of nonlinear adaptive control/prediction and allow a wider range of hardware implementations.

SUMMARY

In a first aspect, some embodiments of the invention provide a system for at least one of adaptive control and adaptive filtering. The system includes a command module configured to provide an initial output, an output module coupled to the command module, a feedback module configured to provide a system state input, and an adaptive module coupled to the command module and the feedback module. The adaptive module includes at least one adaptive sub-module coupled to the output module, where each adaptive sub-module is configured to provide an output modifier to the output module. Each adaptive sub-module includes a plurality of nonlinear components, and each nonlinear component is configured to generate a scalar output in response to the system state input. Each nonlinear component is coupled to the output module by at least one weighted coupling and each weighted coupling has a corresponding connection weight. The scalar output from each nonlinear component is weighted by the connection weights of the corresponding weighted couplings and the weighted outputs are provided to the output module to form the output modifier. Each adaptive sub-module also includes a learning module configured to update the connection weights for each weighted coupling in that adaptive sub-module based on the initial output. The output module is configured to generate a final output by modifying the initial output using the output modifiers.

In a second broad aspect, some embodiments of the invention provide a method for designing a system for providing at least one of adaptive control and predictive filtering. The method includes defining a command module to provide an initial output, an output module to provide a final output, and a feedback module to provide a system state input. The method also includes defining an adaptive module having at least one adaptive sub-module, where each adaptive sub-module is defined to provide an output modifier and includes a learning module and a plurality of nonlinear components. Each nonlinear component is configured to generate a scalar output in response to the system state input. The method further involves determining a plurality of initial couplings such that the adaptive module is coupled to the command module and the feedback module, the output module is coupled to the command module, and each nonlinear component is coupled to the output module by at least one weighted coupling. Each weighted coupling has a corresponding connection weight such that the scalar output generated by each nonlinear component is weighted by the corresponding connection weights to generate a weighted output and the weighted outputs from the nonlinear components combine to provide the output modifier. The output module is configured to generate the final output by modifying the initial output using the output modifiers from each adaptive sub-module, and each learning module is configured to update the connection weights for each weighted coupling in the corresponding adaptive sub-module based on the initial output.

In a third broad aspect, some embodiments of the invention provide a system for at least one of adaptive control and adaptive filtering. The system includes a command module configured to provide an initial output, an output module coupled to the command module, a feedback module configured to provide a system state input, and an adaptive module coupled to the command module and the feedback module. The adaptive module includes at least one adaptive sub-module coupled to the output module, where each adaptive sub-module is configured to provide an output modifier to the output module. Each adaptive sub-module includes a plurality of nonlinear components, where each nonlinear component is configured to generate a response to the system state input. Each nonlinear component is coupled to the output module by at least one weighted coupling, and each weighted coupling has a corresponding connection weight. The response from each nonlinear component is weighted by the connection weights of the corresponding weighted couplings and the weighted responses are provided to the output module to form the output modifier. Each adaptive sub-module also includes a learning module configured to update the connection weights for each weighted coupling in that adaptive sub-module based on the initial output. The output module is configured to generate a final output by modifying the initial output using the output modifiers and the at least one adaptive sub-module comprises a transformative adaptation sub-module configured to provide a transformative output modifier directly using the weighted responses from the nonlinear components.

In some cases, the initial couplings and connection weights are determined using a neural compiler.

In some cases, the output modifier for each adaptive sub-module is a sum of the weighted outputs from each of the nonlinear components in that adaptive sub-module. In some cases, the output modifier generated by at least one of the adaptive sub-modules is multidimensional.

In some cases, at least one of the nonlinear components in an adaptive sub-module that generates a multidimensional output modifier is coupled to the output module by a plurality of weighted couplings, one weighted coupling for each dimension of the multidimensional output modifier. In some cases, each of the nonlinear components in an adaptive sub-module that generates a multidimensional output modifier is coupled to the output module by a plurality of weighted couplings, one weighted coupling for each dimension of the multidimensional output modifier.

In some cases, at least one adaptive sub-module is a bias adaptation sub-module configured to provide a bias output modifier to the output module and the output module is configured to generate the final output by adding the bias output modifier to the initial output.

In some cases, the learning module of the bias adaptation sub-module is configured to update connection weights based on the initial output and the outputs generated by the nonlinear components.

In some cases, the learning module of the bias adaptation sub-module is configured to update the connection weights based on an outer product of the initial output and the scalar outputs from the nonlinear components.

In some cases, at least one adaptive sub-module is a transformative adaptation sub-module configured to provide a transformative output modifier to the output module, and the output module is configured to generate the final output by multiplying the transformative output modifier and the initial output.

In some cases, multiplying the initial output and the transformative output modifier transforms the initial output from a first system space to a second system space to generate the final output.

In some cases, the transformative adaptation sub-module is configured to provide the transformative output modifier directly, based on the weighted outputs from the nonlinear components.

In some cases, the learning module of the transformative adaptation sub-module is configured to update connection weights based on the initial output, the state input and the outputs from the nonlinear components.

In some cases, the learning module of the transformative adaptation sub-module is configured to update connection weights based on an outer product of the initial output and a product of the state input and the weighted outputs from the nonlinear components.

In some cases, the learning module of the transformative adaptation sub-module is configured to update connection weights based on an outer product of the initial output, the state input and the scalar outputs from the nonlinear components.

In some cases, the system also includes a motor module coupled to the output module, and the final output is a control output configured to control operation of the motor module. In some cases, the final output is a predictive output representing a prediction of a future system state.

In some cases, the nonlinear components are neurons. In some cases, the neurons are spiking neurons.

In some cases, at least one of the command module, the output module and the feedback module are implemented in neurons. In some cases, each of the command module, the output module and the feedback module is implemented in neurons.

In some cases, each nonlinear component has a tuning curve that determines the scalar output generated by the nonlinear component in response to any input and the tuning curve for each nonlinear component is generated randomly.

BRIEF DESCRIPTION OF THE DRAWINGS

A preferred embodiment of the present invention will now be specified in detail with reference to the drawings, in which:

FIG. 9A is an illustration of a plot showing the simulated path of a robotic arm performing a reach-out task in an applied force field without an adaptive module;

FIG. 9B is an illustration of a plot showing the simulated path of a robotic arm performing a reach-out task in an applied force field with an adaptive module implemented in accordance with an embodiment;

FIG. 10A is an illustration of another plot showing the simulated path of a robotic arm performing a reach-out task in an applied force field without an adaptive module;

FIG. 10B is an illustration of another plot showing the simulated path of a robotic arm performing a reach-out task in an applied force field with an adaptive module implemented in accordance with an embodiment;

FIG. 128 is an illustration of a plot showing the position along the x-axis of the robotic hand of FIG. 12A as compared with a target position;

DESCRIPTION OF EXEMPLARY EMBODIMENTS

Figure 1:
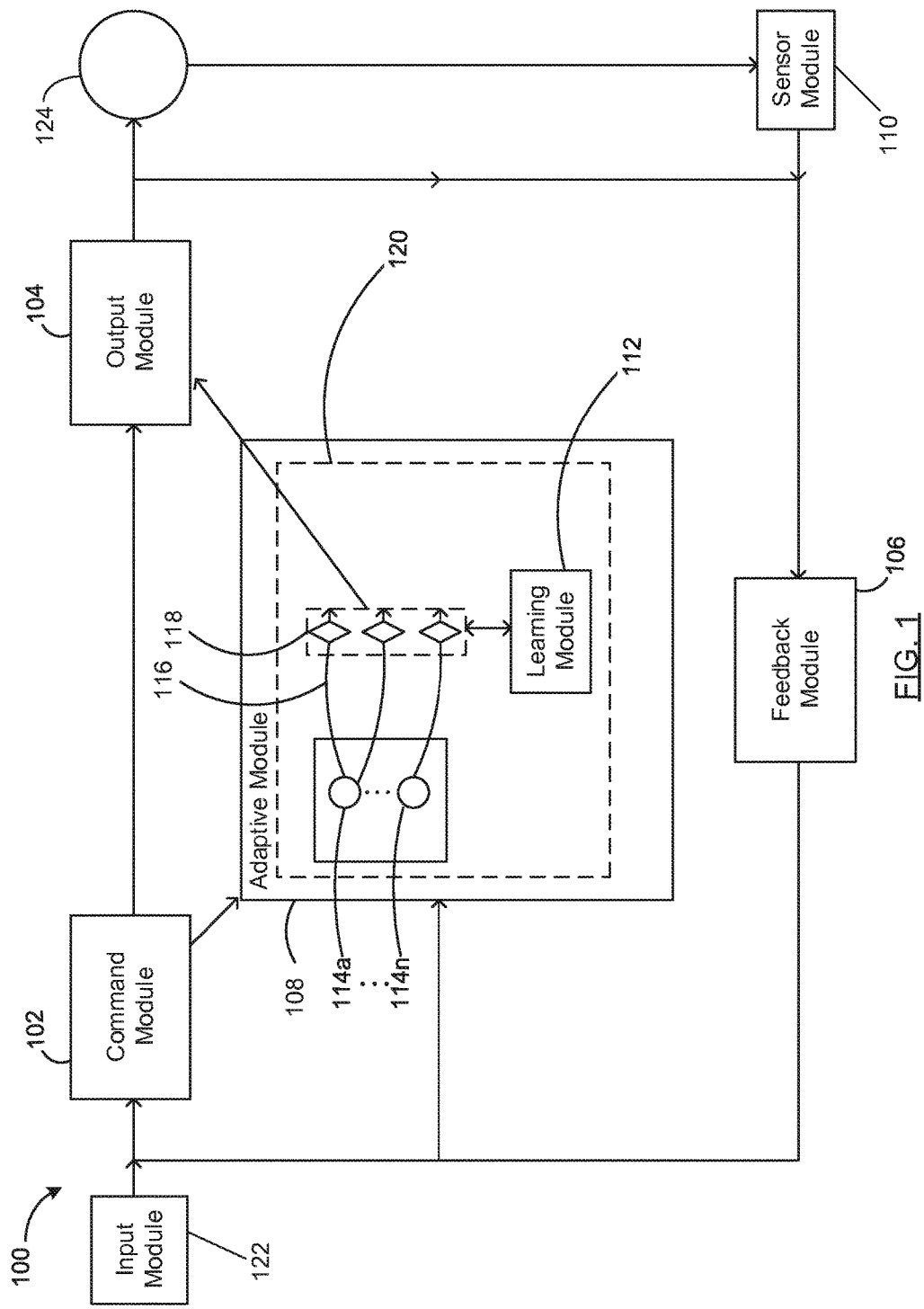
FIG. 1 is a block diagram of a system for providing adaptive control and/or adaptive predictive filtering in accordance with an example embodiment.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

It should also be noted that the terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal or a mechanical element depending on the particular context. Furthermore, the term "communicative coupling" may be used to indicate that an element or device can electrically, optically, or wirelessly send data to another element or device as well as receive data from another element or device.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Embodiments described herein generally relate to a system and method for designing and implementing a system for providing adaptive control and adaptive predictive filtering. Such a system can be implemented using a combination of adaptive and non-adaptive components. The system can be efficiently implemented on a wide variety of distributed systems that include a large number of nonlinear components whose individual outputs can be combined together to implement certain aspects of the control system as will be described more fully herein below.

Examples of nonlinear components that can be used in various embodiments described herein include simulated/artificial neurons, FPGAs, GPUs, and other parallel computing systems. Components of the system may also be implemented using a variety of standard techniques such as by using microcontrollers. Also note the systems described herein can be implemented in various forms including software simulations, hardware, or any neuronal fabric. Examples of mediums that can be used to implement the system designs described herein include Neurogrid (Choudhary, 2012), Spinnaker (Jin, 2008), OpenCL (Stone, 2010), and TrueNorth (Merolla, 2014). As used herein the term 'neuron' refers to spiking neurons, continuous rate neurons, or arbitrary high-dimensional, nonlinear, distributed systems.

A central concern of theoretical neuroscientists has been to understand how advances in control theory relate to algorithms employed by the brain. This understanding could provide insight into new and effective approaches to control and predictive filtering. This could also improve our understanding of neural mechanisms in support of clinical applications.

Recent advances in large-scale neural modeling have focused on how complex spiking neural networks may exhibit a number of sophisticated behaviors we observe in humans and other animals. One such model is SPAUN, which is able to perform some basic perceptual, cognitive, and motor tasks (see "How to Build a Brain: A Neural Architecture for Biological Cognition" by Eliasmith, 2012, the entirety of which is incorporated herein by reference). However, the motor system of the SPAUN model is minimal: it controls a two link linear arm, it can only draw digits from 0-9 (and does so poorly), it is not fully implemented in spiking neurons, and it is unable to adapt to changes in the environment or itself.

Traditional approaches to control theory also have a number of limitations. They are often difficult to scale for systems in higher dimensions or with higher degrees of freedom. As well, these traditional approaches may be limited in their hardware implementations due to the structure of the system models and/or restrictions imposed by different classes of hardware. Further, such approaches have yet to provide an effective manner of modelling the kinematic changes in a system using neurons.

One approach to adaptive control is the learning algorithms developed by Dr. Jean-Jacques Slotine. Slotine's approach starts with a simple linear model, and introduces nonlinear adaptive terms that learn to compensate for the errors in the linear model. Slotine's approach uses sets of Gaussian functions as a basis for control with adaptive bias (see, for example U.S. Pat. No. 5,268,834 to Sanner & Slotine; see also "Adaptive Tracking Control for Robots with Unknown Kinematic and Dynamic Properties" by Cheah et al, 2006).

In the approaches described by Slotine and Cheah, kinematic adaptation cannot be implemented in neurons. Adapting for system kinematics typically involves determining a transformation from a first system space, such as a high-level Cartesian space, to a second system space, such as a low-level joint space in the case of a robotic arm. This transformation can be expressed in the form of a Jacobian matrix. The Jacobian matrix defines a relationship between velocities in the two spaces:

$$\dot{x} = J\dot{q} \quad (1)$$

where $\dot{x}$ is velocity in Cartesian space, $\dot{q}$ is velocity in joint space, and J is the Jacobian. This Jacobian matrix also defines a relationship between forces in these two spaces:

$$u_q = J^T u_x \quad (2)$$

in the case of a control implementation, $u_q$ is a low-level motor command sent to the robotic arm, and $u_x$ is a high-level motor command, that may be generated by a controller or an external input.

In the typical approach to kinematic adaptation (Cheah et al, 2006) this transform is not directly solved for. Rather, the Jacobian multiplied by the joint space velocity is rewritten as a set of known basis functions multiplied by a set of system parameters, $$Y_m(q,\dot{q})\theta_m = J(q,\theta_m)\dot{q} = \dot{x} \quad (3)$$

and the unknown system parameters are approximated with a set of learned parameters, $\hat{\theta}_m$, are solved for in the equation:

$$Y_m(q,\dot{q})\hat{\theta}_m = \hat{J}(q,\hat{\theta}_m)\dot{q} \approx \dot{x} \quad (4)$$

where $Y_m(q,\dot{q})$ is a set of basis parameters and $\dot{q}$ represents the system velocity. An approximation of the Jacobian, $\hat{J}$, is artificially extracted afterwards from $Y_m\hat{\theta}_m$ by extracting the $\dot{q}$ terms.

This formulation of the problem leads to difficulties for implementation in distributed systems: the approximated Jacobian cannot be extracted from the velocity terms. Thus, it cannot be used to transform a high level control or prediction input to a low-level system space.

This is because the signal representing the Jacobian multiplied by the joint space velocity is distributed across the weights on the basis functions rather than stored in a set of distinct parameter approximations, as can be done in traditional programming methods. This means that J and $\dot{q}$ are intertwined in the decoded signal, and J by itself cannot be extracted.

The approach described by Slotine and Cheah use basis functions that give multidimensional outputs. That is, the output of each nonlinear component has the same form and dimensions as the overall adaptive term being solved for. Accordingly, the system must be implemented using components specifically configured to generate an output having the dimensions required for the system sub-module being controlled. Thus, a new system design may be required for each new system sub-module that is controlled.

This design also has difficulty scaling to higher dimensions. As the dimensionality of the system sub-module increases, the number of nonlinear components required to tile the state space increases exponentially. This design may require an increased amount of space when being physically implemented in hardware and can become impractical and inefficient for controlling or predicting system sub-modules with high degrees of freedom.

Previous approaches to neural implementations of predictive filtering and control have also been limited in their efficiency and scope. Typically, if the systems implemented any learning, the learning began from a blank slate and used all available resources to attempt to approximate the complex transformations from input signals and system feedback.

The various embodiments described herein provide novel and inventive systems and methods for nonlinear adaptive control and adaptive prediction. These systems and methods can be implemented using a variety of nonlinear components, such as a large-scale spiking neuron model, FPGAs, GPUs, and other parallel computing systems. These systems and methods are able to adapt to changes in system dynamics, such as environmental changes, and changes to system kinematics, such as changes in the physical properties of the system due to growth, degradation or manipulation of unknown objects.

The systems and methods described herein provide a reformulation and extension of previous approaches to adaptive non-linear control and predictive filtering. These reformulations and extensions result in a system design that provides effective adaptive control and adaptive predictive filtering. This system design can also be efficiently implemented in a wide range of hardware configurations.

Recent developments in new classes of hardware may provide significant efficiencies for systems designed to take advantage of the hardware. Neuromorphic hardware is one such example. Neuromorphic hardware typically uses components that communicate using scalar outputs, such as spiking neural networks. A neuromorphic hardware implementation offers the advantages of low-power, high-speed implementations of the model, increasing the effectiveness of the control system by reducing response time and allowing more neurons to be simulated.

Traditional approaches to nonlinear adaptive control and prediction cannot be efficiently implemented in neuromorphic hardware. In contrast, embodiments of the system design for providing nonlinear adaptive control and prediction described herein have been specifically configured to take advantage of the benefits provided by this emerging class of hardware. It should be noted, however, that the embodiments described herein are not limited to implementations with neuromorphic hardware and can provide efficient and effective nonlinear adaptive control and prediction in other hardware implementations as well.

The problems of control and prediction are mathematical duals of one another. This means that by solving one of these problems you have solved both. In this case, both solutions involve the development of accurate models of the environment and system dynamics. In the prediction problem a 'forward' model is developed, where the goal is to predict the future state of the system being observed given the current state. In the control problem an 'inverse' model is developed, where the goal is to generate a set of control outputs that will cause the system to move to a desired future state. Because of this duality, the same nonlinear adaptive system design can be used to implement filters, which addresses the prediction problem.

In embodiments described herein, a system structure is imposed over the distributed system that implements an engineered architecture. This architecture determines a core set of network dynamics that carry out specific functions related to control or prediction. The adaptation systems and methods can be applied to limited areas of the system to allow the system to learn to compensate for unmodeled system dynamics and kinematics. Adaptive modules are implemented in several locations identified as optimal for performance.

The network connection weights between the various system components are set such that the functions and dynamics imposed by the engineered architecture are carried out. In the adaptive modules, seed connection weights can be set based on an approximation of the correct values generated by the adaptive modules. This allows the system to be efficiently programmed, more rapidly operational, and allows the system to make efficient use of non-learning neuromorphic (or other) hardware. Such an approach may be generally preferable to past methods that start from a null or random state with each new system. The approximations can be used to bootstrap the systems described herein. This starts the systems much closer to the solution and may greatly speed up the time to convergence.

Specifically, the systems described herein may incorporate two distinct types of adaptation. The first, which is referred to herein as bias or additive adaptation (sometimes represented by the additive term $u_{adapt}$) learns to compensate for external perturbations (e.g. a force field) as well as modeling errors affecting dynamic properties of the system (e.g. system components being heavier than expected). The second kind of adaptation is referred to as transformative or multiplicative adaptation. This adaptation can be used to transform an input from the abstract high-level space to the low-level space of the system (i.e., between the (x, y) position of the end effector and the q of the arm configuration in joint angle space). This type of adaptation can account for kinematic changes to the system itself, such as length due to growth or manipulation of unknown objects. This adaptation may be used to approximate or supplement a Jacobian transform matrix ($J^T$) that can be applied to an input to transform it from a first system space to a second system space.

In nonlinear adaptive control it is assumed that the initial control output is sub-optimal for the system under control, resulting in performance errors. To compensate, two sets of nonlinear basis functions can be added to the control system. These basis functions receive signals with the relevant system information and generate some set of responses. This output can be weighted by a set of learned parameters, and incorporated into the control signal through addition or multiplication.

Figure 3:
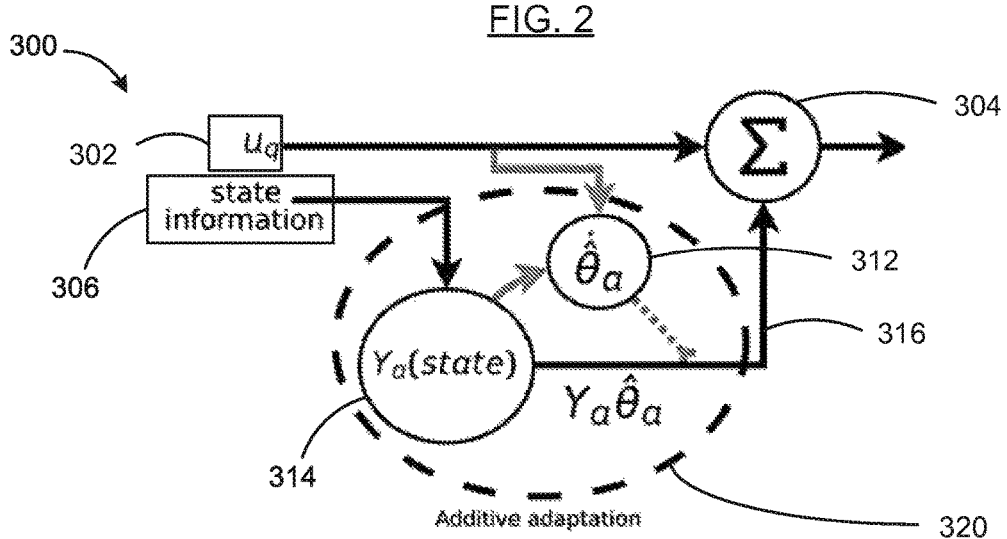
FIG. 3 is a block diagram of a system for providing adaptive control and/or adaptive predictive filtering with an adaptive bias sub-module in accordance with an example embodiment.

Referring now to FIG. 3, shown therein is an example embodiment of a system 300 for providing at least one of adaptive control and adaptive predictive filtering. System 300 includes a command module 302, an output module 304, a feedback module 306 and a bias adaptation sub-module 320. The bias adaptation sub-module 320 includes a plurality of nonlinear components 314 and a learning module 312. Each of the nonlinear components 314 is coupled to the output module 304 by at least one weighted coupling 316. Each weighting coupling 316 has a corresponding connection weight.

System 300 is an example of a system structure or system design where nonlinear adaptation can be applied to an initial input u using an output modifier from the bias adaptation sub-module 320. In some cases, the command module 302 may receive as an input any kind of control signal or target information. The command module 302 can use the input to generate an initial control signal or initial control output. The bias adaptation sub-module 320 is configured to provide the output module 304 with a bias output modifier. This bias output modifier can be used to account for the unmodeled dynamics of the system.

The initial output of the system 300, u, can be defined as:

$$u = K_p(q^*-q) - K_v(\dot{q}^*-\dot{q}), \tag{5}$$

where q and $\dot{q}$ are the system position and velocity vectors, $q^*$ and $\dot{q}^*$ are the target position and velocity vectors, and $K_p$ and $K_p$ are gain terms.

Generally, there are assumed to be some forces that are unaccounted for by the initial output, which will be denoted $F_{unknown}$. The nonlinear components 314 in the bias adaptation sub-module 320, (denoted $Y_a$ as a group), can be implemented using any type of nonlinear component that can made sensitive to task relevant feedback (i.e. generate a nonlinear output in response to a system state input from the feedback module 306). For example, the nonlinear components 314 may be a population of neurons.

Each nonlinear component 314 generates a scalar output in response to the feedback. In different embodiments, the actual form of the output generated by the nonlinear components 314 may depend on the particular components used to implement the nonlinear components. However, in general, system 300 and embodiments of the systems and methods described herein are configured to treat the output from each nonlinear component 314 as a scalar or one-dimensional value.

The scalar output generated by each of the nonlinear components 314 may depend on the configuration or properties of the particular nonlinear component. The scalar outputs are designed to be weighted by connection weights $\theta_a$. The weighted outputs combine to provide an output modifier that is intended to model the unknown forces acting on the system 300. This relationship is formally captured as:

$$F_{unknown} = Y_a \theta_a. \tag{6}$$

In the embodiment shown in FIG. 3, the goal of the adaptive sub-module 320 is to learn the connection weights $\theta_a$ so the initial output can be modified to account for the unknown forces. An initial set of connection weights or parameters $\hat{\theta}_a$ can be generated when the system is designed or initially implemented. As will be discussed below, this initial set of connection weights may be generated using a neural compiler. The learning module 312 is configured to update these connection weights to drive them towards values that accurately compensate for the unknown force. The learning module 312 can update the connection weights using the equation:

$$\dot{\hat{\theta}}_a = -L_a Y_a \otimes u_q \tag{7}$$

where $\otimes$ is the outer product operation, $L_a$ is the learning rate for the nonlinear components 314, and $u_q$ is the initial output. In this case, the initial output $u_q$ also serves as the error term. This update rule was derived to account for the use of nonlinear components 314 that generate scalar outputs.

In previous approaches, each nonlinear component 314 was configured to generate an output with the same form and dimensions as the desired output modifier. In system 300, the output from each nonlinear component 314 is a scalar or one-dimensional output. These scalar outputs are weighted by the connection weights of the weighted couplings 316 between the nonlinear components 314 and the output module 304.

In this case, the weighted outputs of the nonlinear components 314 combine to provide an output modifier to the output module 304. The output module 304 can then add the output modifier to the initial output to generate the final output. The final output of the system 300 is then:

$$u_q + Y_a \hat{\theta}_a. \tag{8}$$

In some cases, the number of weighted couplings 316 between each of the nonlinear components 314 and the output module 304 may depend on the dimensionality of the output modifier required. For example, in this case the bias output modifier may be in a vector form that corresponds to the dimensions of the initial control output. Accordingly, in some embodiments each nonlinear component 314 may have a distinct weighted coupling 316 to the output module 304 for each dimension of the output modifier vector.

It should be noted, however, that certain hardware implementations may be limited in the number of physical connections that can be present in the system. Accordingly, in some embodiments, it is not necessary for each nonlinear component 314 to have a distinct weighted coupling 316 to the output module 304 for each dimension. In such cases, the dimensions for which a nonlinear component 314 does not have a coupling to the output module 304 may be treated as having a connection weight of zero. Different possible approaches to implementing these weighted couplings will be apparent to the skilled reader.

To implement the system designs herein on any distributed system, for example neuromorphic hardware, coding methods such as those described in the Neural Engineering Framework (NEF) can be used. One example of such an implementation may use spiking neural networks. The same coding methods (i.e. NEF) for distributed systems can be used to implement the embodiments of the systems described herein in neurons. A more detailed discussion of the neural engineering framework and the neural coding methods described herein can be found in "Neural Engineering: Computation, Representation, and Dynamics in Neurobiological Systems" by Eliasmith and Anderson, 2003, the entirety of which is incorporated herein by reference as well as in "How to Build a Brain" referenced earlier.

The NEF allows high-level algorithms to be converted into realistic spiking neuron models. It acts as a type of 'neural compiler' that calculates a connection weight matrix to perform a desired function. Some basic principles of the NEF are that a) groups of neurons are treated as distributed representations of vectors, and b) connections between groups of neurons can specify a computation to be performed on those vectors. Given a function, the NEF can determine the synaptic connection weights between populations of neurons that will efficiently compute the function.

To implement system 300 using neurons as the nonlinear components 314, we need to be able to represent and transform vector signals using neuron populations. To represent a vector using a group of neurons, the NEF generalizes the idea of preferred direction vectors. Each neuron in a group is assigned an encoder, e, which is a chosen vector defining which input signals the related neuron responds most strongly to. The encoder e may be considered as the tuning curve for a neuron. In some cases, the encoders for each neuron may be generated randomly. Let the input current to each neuron be denoted I, and calculated as:

$$I = \alpha e \cdot x + I_{bias} \tag{9}$$

where $\alpha$ is a gain value, x is the input signal, and $I_{bias}$ is some background current. The gain and bias values can be determined for each neuron as a function of attributes such as maximum firing rate. As shown in equation (9), the input current to a neuron can be considered a linear function of the value being represented.

The activity of the neuron can then be calculated as:

$$a = G[I] \tag{10}$$

where G is some nonlinear neuron model, I is the input current defined above, and a is the resultant activity of that neuron. Accordingly, the activity of a neuron can provide a representation of the value provided to the neuron.

While equations (9) and (10) let us map from an input value to neural activity, we can define a set of decoders, d, to do the opposite. That is, an estimate of the initial value provided to the neurons can be determined from a linear sum of the activity of each neuron multiplied by its corresponding decoder:

$$\hat{x} = \Sigma a_i d_i \tag{11}$$

To define the decoding, the postsynaptic current (PSC) can be modelled:

$$h(t) = e^{\frac{-t}{\tau_{PSC}}} \quad (12)$$

where $\tau_{PSC}$=time constant of decay of the PSC.

Given an input spike train $\delta(t-t_{im})$ from the above encoding, using the PSC to filter the spikes gives an activity of $$a_i(x) = \Sigma_m h(t-t_{im}) \quad (13)$$

The overall decoding equation to determine the estimate of the initial value provided to the neurons is then:

$$\hat{x} = \Sigma_{i,m}^{N,M} h_i(t-t_{im}) d_i \quad (14)$$

where N is the number of neurons, M is the number of spikes, i indexes the neurons, m indexes the spikes, h(t) is the PSC of the neuron, $\hat{x}$ is the estimate of the variable being represented, and $d_i$ is the decoder for neuron i to estimate x.

Finding the set of decoding weights that minimizes the difference between x and its estimate $\hat{x}$ is a least-squares minimization problem:

$$E = \int_R [x - \Sigma_i^N (a_i(x)+n_i) d_i]^2 dxdn \quad (15)$$

where N is the number of neurons, $n_i$ is a random perturbation, R is the range over which the representation is to be optimized and $d_i$ are the D-dimensional decoders to be determined.

Importantly, we can also use d to calculate synaptic connection weights that compute a desired function or transformation on the vector signal represented. To do so, we replace x with f (x) and solve the least squares minimization problem:

$$E = \int_R [f(x) - \Sigma_i^N (a_i(x)+n_i) d_i]^2 dxdn \quad (16)$$

The function being approximated can be built out of linear sums of the tuning curves of the neurons in the neuron population. A function can be estimated using a neural population by:

$$\hat{f}(x) = \Sigma a_i(x) d_i^f \quad (17)$$

For non-linear operations, a solution to the minimization problem for f(x) allows us to determine the values of d to calculate the desired function:

$$d^{f(x)} = \Gamma^{-1} Y,$$

$$\Gamma_{ij} = \int_R a_i a_j dx,$$

$$Y_j = \int_R a_j f(x) dx \quad (18)$$

This minimization of the L-2 norm (squared error) is one of many possible minimizations. Different minimization procedures may provide different features (for example, L-0 tends to be sparser). Any minimization approach resulting in linear decoders can be used. In addition, the minimization can proceed over the temporal response properties of G, instead of, or as well as, the population vector response properties described here. This general approach allows high-level algorithms written in terms of vectors and computations on those vectors to be converted into detailed neuron models. The connection weights of a neural network can then be defined for a given pre-synaptic neuron i and post-synaptic neuron j as:

$$\omega_{i,j} = \alpha_j e_j d_i^{f(x)}. \quad (19)$$

The method of representation used in the NEF also allows values to be added by feeding two inputs into the same group of neurons. For example, if a group of neurons A is coupled to a group of neurons C with connection weights that compute f(a) and a group of neurons B is coupled to C with connection weights that compute g(b), then the neurons in group C will have an activity pattern that represents f(a)+g(b).

In a preferred embodiment described herein, the system 300 can be configured to use the decoder values, $d_i^{f(x)}$ as the learned parameters $\hat{\theta}_a$. The update to the connection weights performed by the learning module 312 can then be phrased both in terms of decoders and in the more common form of connection weight updates. The decoder form of the learning update can be described by:

$$\dot{d}_i = L\alpha_i err, \quad (20)$$

where L is the learning rate, and err is the error signal. A form of the learning update for adjusting the connection weights can be described by:

$$\dot{\omega}_{i,j} = L\alpha e \cdot a_i err. \quad (21)$$

This form of the learning update is known as the prescribed error sensitivity (PES) learning rule. In some cases, other learning updates may be used such as extensions to the PES rule (e.g. the hPES rule) or alternatives such as Oja's rule may also be used.

Although the foregoing should be sufficient to allow a skilled reader to implement the features of the NEF, the open-source cross-platform Java application Nengo is an example of a graphical and scripting software can be used to represent a variety of algorithms in a spiking neural network model.

In the embodiment shown in FIG. 3, the system velocity is accounted for after the initial control signal has been transformed to a low-level system space. It should be noted that the system velocity can be accounted for either before or after transformation from high-level to low-level spaces. That is to say, the low-level control signal can be determined using either $$u_q = J^T (K_p(x^*-x) - K_v(\dot{x}^*-\dot{x})), \quad (22)$$

or $$u_q = J^T (K_p(x^*-x)) - K_v(\dot{q}^*-\dot{q}), \quad (23)$$

where $x^*$ and $\dot{x}^*$ are the target position and velocity in Cartesian coordinates, and $\dot{q}^*$ is the target velocity in joint space.

Figure 5:
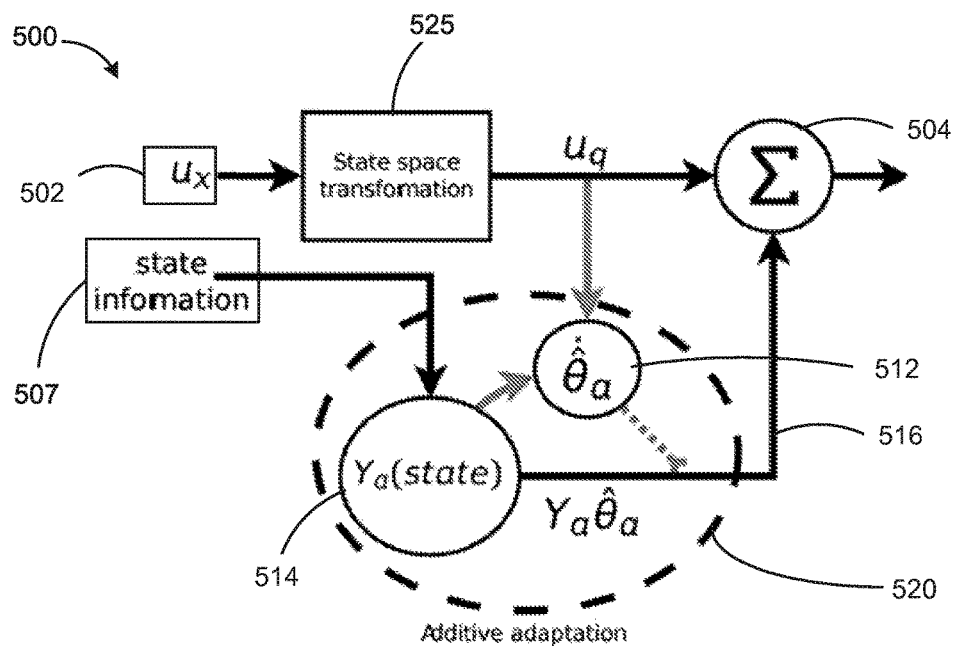
FIG. 5 is another block diagram of a system for providing adaptive control and/or adaptive predictive filtering with an adaptive bias sub-module in accordance with another example embodiment.

Referring now to FIG. 5, shown therein is another example embodiment of a system 500 for providing at least one of adaptive control and adaptive predictive filtering. System 500 is an example embodiment of a system using a bias adaptation sub-module 520 with a hierarchy 525 that transforms the initial output from a first system space to a second system space. In some embodiments, the hierarchy 525 can be implemented using systems described herein that incorporate a transformative adaptation sub-module.

System 500 comprises a command module 502, an output module 504 and a bias adaptation sub-module 520. The bias adaptation sub-module 520 includes a plurality of nonlinear components 514, which can be implemented using neurons, and a learning module 512. Each of the nonlinear components 514 are coupled to the output module 504 by at least one weighted coupling 516.

In some cases, the bias adaptation of system 500 can be performed using a decoding of the neuron activity instead of the neuron activity itself. Instead of using the group of neurons as the set of basis functions, Y, the neuron activity can be decoded into a matrix A, using the NEF methods described above. This matrix A can then multiplied by the learned parameters $\hat{\theta}$. This approach may be useful when the form of the disturbances is known.

For example, if perturbations are known to occur at frequencies determined as a function of some parameter of the system, denoted x here, then the basis functions can be created to represent these functions, i.e. A(x), based on outputs from the nonlinear components 514. The final output of system 500 can thus be described as:

$$u_q + A\hat{\theta}, \tag{24}$$

Where the learning module 512 updates the earning parameters by:

$$\dot{\hat{\theta}} = L_a A u_q. \tag{25}$$

Equivalently, this can be rewritten in terms of the decoders of the neural population (i.e. nonlinear components 514) as:

$$\dot{\hat{\theta}} = L_a a d^A u_q, \tag{26}$$

where a is the activity of the neurons, and $d^A$ is the set of decoders calculated to generate the A matrix from this activity. As described above, learning can be implemented in neurons and other nonlinear components using NEF methods.

In an example implementation, system 500 can be used to provide adaptive control for a system sub-module that includes a three link arm model with complex, nonlinear dynamics. In this example, the initial control output can be transformed from end-effector Cartesian coordinates, referred to as 'high-level' and denoted by x, into joint space, referred to as the 'low-level' and denoted by q, using hierarchy 525.

The hierarchy 525 can be implemented in various ways. For example, the hierarchy 525 could be implemented with a fixed approximation of the transformation from the high-level system space to the low-level system space for system 500. Alternatively, the hierarchy 525 could make use of the adaptive modules described herein to implement a hierarchy 525 that is able to learn the transformation from the high-level system space to the low-level system space online. In some cases, the hierarchy 525 may be seeded with an initial estimate of the system transformation that can then be refined and corrected using a transformative adaptation sub-module.

Command module 502 may receive as an input a desired target or goal for the hand of the arm model to reach to. Although not shown, command module 502 can also receive a system state input from the feedback module 506 indicating a current location of the hand. The command module 502 can generate a high-level control output u based on the difference between the current location of the hand and the goal, for example using a PD controller. The hierarchy 525 then translates the initial control output (force command) from end-effector space into joint space, generating a low-level control output (joint torque command) $u_q$.

This initial low-level control output can be provided to the output module 504. The output module 504 can modify the initial control output using the bias adaptation output modifier from the bias adaptation sub-module 520 to generate the final output. This final output can then be sent to a motor module configured to control the robotic arm.

In the example shown in FIG. 5, the feedback module 506 can provide joint positions and angular velocities as feedback. The bias adaptation sub-module 520 can use the angular velocity feedback as the system state input provided to the nonlinear components 514. In the various embodiments described herein, a feedback module such as feedback module 506 can be configured to provide any task-relevant information to the adaptation modules for use in determining the update to the learning parameters and/or in providing an output modifier. Each of the nonlinear components 514 generates a scalar output in response to the system state input. The scalar outputs are weighted by the connection weights of the corresponding weighted couplings 516 and provided to the output module 504 as the bias output modifier.

The learning module 512 can use the initial low-level control output as an error signal for updating the connection weights. The learning module 512 can update the connection weights based on the initial low-level control output and the outputs from the nonlinear components 514 as described in equation (7).

The system 500 can be implemented in neurons using the NEF methods described above. As mentioned above, the system velocity can be incorporated into the control signal either before (equation 22) or after (equation 23) transformation from high-level to low-level spaces. While the implementation shown in FIG. 5 uses the latter approach, either approach can be used.

Figure 6:
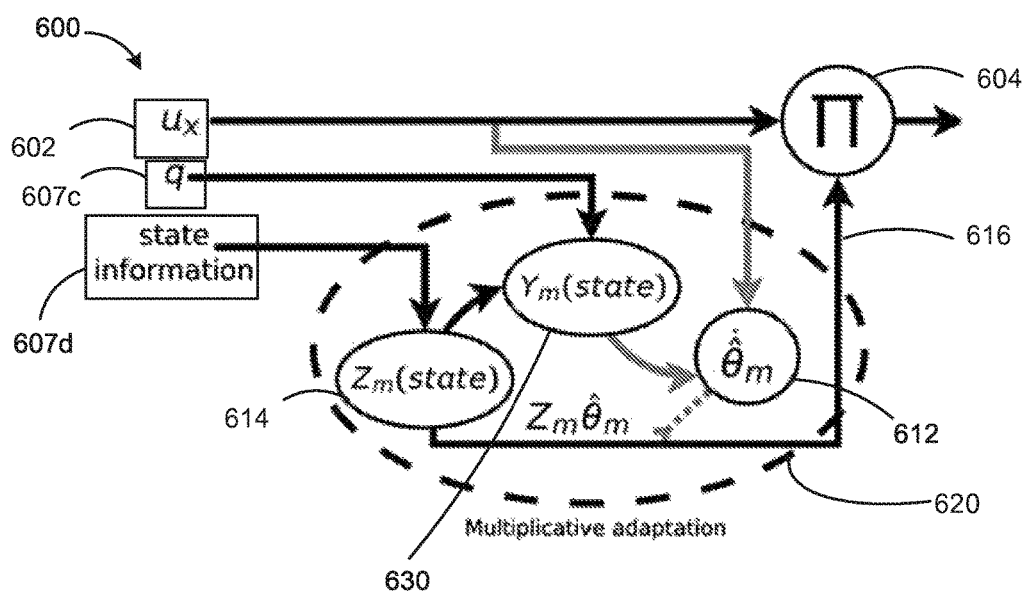
FIG. 6 is a block diagram of a system for providing adaptive control and/or adaptive predictive filtering with an adaptive transformation sub-module in accordance with an example embodiment.

Referring now to FIG. 6, shown therein is an example embodiment of a system 600 for providing at least one of adaptive control and adaptive predictive filtering. System 600 comprises a command module 602, an output module 604 and an adaptive sub-module 620. System 600 is an example embodiment including a transformative adaptation sub-module 620 configured to provide a transformative output modifier.

The transformative adaptation sub-module 620 comprises a plurality of nonlinear components 614 coupled to the output module 604 by weighted couplings 616. The transformative adaptation sub-module 620 also includes a learning module 612 configured to update the connection weights of the weighted couplings 616.

A state information input 607d is provided to the nonlinear components 614 and each nonlinear component 614 is configured to generate a scalar output in response. The scalar outputs are weighted by the connections weights of the weighted couplings 616 and provided to the output module 604 as the transformative output modifier.

In the embodiment shown in FIG. 6, the adaptive sub-module 620 also includes a plurality of nonlinear learning components 630. The outputs from the nonlinear learning components 630 are used by the learning module 612 to determine updates to the connection weights.

The nonlinear learning components 630 receive state inputs 607c. In the example shown in FIG. 6, the state inputs 607c are the system velocities of the system sub-module under control or observation. As mentioned above, in different example embodiments of the system 600 the nonlinear components 614 and nonlinear learning components 630 can be coupled to a feedback module configured to provide any task-relevant information. The nonlinear learning components 630 also receive outputs from the nonlinear components 614. The nonlinear learning components 630 combine these inputs and provide a parameter update input to the learning module 612.

In some cases, the nonlinear learning components 630 receive the weighted outputs from the nonlinear components 614. The nonlinear learning components 630 can generate the parameter update input as a product of the weighted outputs and the state input 607c. This parameter update input can then be provided to the learning module 612. The learning module 612 may then update the connection weights based on an outer product of the initial control output and the parameter update input (i.e. the product of the nonlinear outputs and the state input).

System 600 is one possible network structure incorporating a transformative adaptation sub-module. In implementations for performing adaptive control, a target input for the high-level system, the goal, can be provided to the command module 602. The command module 602 can calculate a difference between the current system state and the desired system state and generate an initial control output $u_x$. The initial control output can be generated in various ways, such as using a PD controller. The initial control output $u_x$ can be provided to the output module 604 for modification using an output modifier and to the learning module 612 for use in updating the connection weights.

The transformative adaptation sub-module 620 generates a transformative output modifier that is provided to the output module 604. In this case, the output module 604 is configured to multiply the initial control output u and the output modifier to transform the control output from a first system space to a second system space. This transformed control output is the final control output generated by the output module 604.

In the example embodiment shown in FIG. 6, the output modifier provided by the adaptive sub-module 620 may be denoted $\hat{J}$, indicating that it is an approximation of the Jacobian transformation between the first system space and the second system space. In this case, the final output, $u_q$, generated by the output module 604 can be described as:

$$u_q = \hat{J}^T(K_p(x^*-x)) - K_v(\dot{q}^*-\dot{q}). \tag{27}$$

As mentioned previously, although the velocity compensation is incorporated into the control signal after the transformation in this example, it could also be performed before transformation.

The embodiment shown in FIG. 6 is an example of a system 600 that can be used to learn how to transform a control input from one space, such as end-effector space, to another, such as joint space. In essence, the transformative adaptation sub-module can learn to approximate the Jacobian transform that was explicitly programmed into the hierarchy 525 described with reference to FIG. 5 above. These approaches can be combined, where a calculated Jacobian transformation can be used as a seed or initial estimate for the transformative output modifier (e.g. by using equation 18). The transformative adaptation sub-module can then fine-tune the initial estimate using the methods described herein.

As discussed above, in the typical formulation (Cheah et al, 2006) for kinematic adaptation the transform (Jacobian) is not directly solved for. Instead, the learned parameters, $\hat{\theta}_m$, are solved for in the equation:

$$Y_m(q,\dot{q})\hat{\theta}_m = \hat{J}(q,\hat{\theta}_m)\dot{q}, \tag{4}$$

and then the transform approximation, $\hat{J}$, is artificially extracted afterwards from $Y_m\hat{\theta}_m$ by removing the $\dot{q}$ terms. The systems and methods described herein reformulate the problem to solve for $\hat{\theta}_m$ in:

$$Z_m\hat{\theta} = \hat{J}(q,\hat{\theta}_m), \tag{28}$$

Here, $Z_m$ can be a third-rank tensor. That is, the combined scalar outputs from the nonlinear components 614 can be treated as a third-rank tensor. Using the reformulation in (28), a new learning rule can be determined for use by the learning module 612 when updating the connection weights/learning parameters.

A system state input drives the activation of the nonlinear components 614 (e.g. neurons) in the multiplicative basis set, $Z_m$. $Z_m$ is defined as the combined activity of the plurality of nonlinear components 614 in the adaptive sub-module 620. Each of the nonlinear components 614 generates a scalar output in response to the system state input 607*d*. This scalar output is again weighted by the learned parameters $\hat{\theta}_m$.

In this case, the output modifier can be generated as a weighted summation, $\hat{J}$, that is sent to the output module 604. The output module 604 multiplies the output modifier with the initial control output $u_x$ to transform the initial control output from a high-level signal to a lower level signal. The system velocities 607*c*, $\dot{q}$, can be separately multiplied by the weighted outputs from the nonlinear components 614 in $Z_m$ to generate a learning signal to be used by the learning module 612 to determine the parameter update values $\dot{\hat{\theta}}_m$ for adjusting the connection weights of the weighted couplings 616.

The learning module 612 can determine the updates for the connection weights/parameters $\hat{\theta}_m$ using:

$$\dot{\hat{\theta}}_m = -L_m\dot{q}^T Z_m^T K_p(x^*-x), \tag{29}$$

where $L_k$ is the learning rate for the adaptive transform. Note that $u_x$ (represented in (29) by the $K_p(x^*-x)$ term) refers to the high-level initial control output. In system 600, the final output to the system sub-module being controlled is in a second system space, the transformation to which is learned. The system 600 can be implemented in neurons and other nonlinear components through the neural coding described in the previous sections.

In the example shown in FIG. 6, a large set of nonlinear components 614 can be used whose outputs represent a third-rank tensor. This approach uses a single set of learned parameters/connection weightings that weight the scalar outputs of multiple nonlinear components for the different decoded dimensions of the transformative output modifier. An alternative and potentially more efficient implementation of this system could use a smaller set of nonlinear components with multiple learned parameters. In this alternative approach, the decoding of different dimensions could be done from the scalar outputs of a single set of nonlinear components.

To implement this alternative approach, we define a set of basis functions $X_m$ to be the combined activity of some population of nonlinear components such as neurons. In this case, the parameters, $\theta_m$, can be implemented as a tensor, and we define $X_m$ such that $$X_m\theta_m = J. \tag{30}$$

If, for example, the transformative output modifier being approximated is a Jacobian J that is a 3×2 matrix, then $X_m$ will be a vector length n, where n is the number of nonlinear components in our adaptive sub-module, and $\hat{\theta}_m$ will be a tensor of size n×3×2.

The update to the parameters/connection weights can be determined using:

$$\dot{\hat{\theta}}_m = -L_m X_m \otimes \dot{q} \otimes K_p(x^*-x) \tag{31}$$

This system can also be implemented in neurons and other nonlinear components through the neural coding described in the previous sections.

The foregoing discussion provides the basis for a system design for adaptive control and adaptive predictive filtering that can be implemented in neurons and other nonlinear components using the neural coding methods described above. These designs can then be implemented in hardware to provide an efficient and effective system that adapts online to both internal and external unmodeled forces and dynamics.

In short, the systems and methods described herein integrate changes in control theoretic approaches with neuroscientific constraints to specify a general design for systems implementing adaptive control and/or adaptive predictive filtering. These designs are of particular interest given recent developments in neuromorphic hardware that require advanced algorithms, in some cases employing spiking neural networks.

Using a neural compiler as described above to design and couple neural populations for the adaptive systems described herein, these systems can be directly implemented on neuromorphic hardware, such as the recent IBM chip TrueNorth (see Merolla et al., "A million spiking-neuron integrated circuit with a scalable communication network and interface" *Science*, 345(6197):668-673, 2014), Neurogrid (see Benjamin et al., "Neurogrid: A mixed-analog-digital multichip system for large-scale neural simulations", *Proceedings of the IEEE*, 102(5):699-716, 2014), or SpiNNaKer (see Painkras et al., "Spinnaker: A 1-w 18-core system-on-chip for massively-parallel neural network simulation" *Solid-State Circuits, IEEE Journal of*, 48(8):1943-1953, 2013).

The ability to implement adaptive control and adaptive predictive filtering may provide significant benefits in terms of power efficiencies. For example, the TrueNorth architecture may consume as much as 176,000 times less energy per synaptic event than a general-purpose microprocessor running the exact same network (see Merolla et al.). TrueNorth is also able to provide 46 billion synaptic operations per second (SOPS) per watt for a typical network and 400 billion SOPS per watt for networks with high spike rates and high numbers of active synapses. Although not a direct comparison, the most energy-efficient supercomputers tend to achieve approximately 4.5 billion floating-point operations per second per watt. Accordingly, a system design configured to take advantage of the significant power efficiencies available with neuromorphic hardware will be beneficially in a wide range of applications.

Referring now to FIG. 1, shown therein is an example embodiment of a system 100 for providing at least one of adaptive control and adaptive predictive filtering. System 100 includes a command module 102, an output module 104, a feedback module 106 and an adaptive module 108. In some cases, system 100 may also include a sensor module 110, an input module 122 and a sub-system module 124. Sub-system module 124 represents the system that is being controlled and/or observed using system 100.

Command module 102 is configured to provide an initial output. The initial output provided by command module 102 may be an initial control output in the case of an adaptive control system or an initial predictive output in the case of a predictive filtering system. System 100 is designed to adapt the initial output to account for unknown or changing parameters of the system dynamics and kinematics.

Output module 104 is coupled to the command module 102 and the adaptive module 108. The output module 104 is configured to generate a final output based on the initial output. The output module 104 receives one or more output modifiers generated by the adaptive module 108. The output module 104 generates the final output by modifying the initial output using the received output modifiers. The final output can be used for control and/or prediction depending on the particular implementation of system 100.

Feedback module 106 is configured to provide a system state input representing a current state of the system 100. In general, feedback module 106 can be configured to provide a system state input that includes any information that may be relevant to the task(s) performed in system 100. In some cases, feedback module 106 may be coupled to a sensor module 110. Sensor module 110 may be configured to measure one or more parameters of the sub-system module 124 that is being controlled or observed. The feedback module 106 can use the measured parameters to generate the system state input representing a current state of the sub-system module 124.

In some cases, the feedback module 106 may also incorporate a predictive model of the system to generate the system state input. The feedback module 106 may use the predictive model to generate the system state input independently or in addition to the current state parameters measured by sensor module 110. In some cases, this predictive model can be based on a predictive output generated by output module 104.

Sensor module 110 may include one or more sensors configured to measure current system parameters of system sub-module 124. For example, sensor module 110 may include one or more cameras, infrared sensors, rf sensors, temperature sensors and various other measurement devices that may depend on the system parameter being measured. The output from each sensor can be used to generate a measured system state input that can be provided to the feedback module 106. The feedback module 106 can then use the measured system state input when generating a system state input to be provided to various modules of the system 100, such as the command module 102 and the adaptive module 108.

Adaptive module 108 is coupled to the command module 102 and the feedback module 106. Adaptive module 108 comprises at least one adaptive sub-module 120 coupled to the output module 104. Each adaptive sub-module 120 is configured to provide an output modifier to the output module 104.

Each adaptive sub-module comprises a plurality of nonlinear components $114a$-$114n$. The nonlinear components 114 can be implemented in various ways, such as by using simulated neurons, FPGAs, GPUs, and other parallel computing systems for example. Each of the nonlinear components 114 can be configured to generate a scalar output in response to the system state input provided by the feedback module 106.

In some cases, the output generated by each nonlinear component 114 can be defined by a tuning curve. The tuning curve for a nonlinear component 114 describes the response generated by that nonlinear component to each input in a range of inputs. In some cases, the tuning curve for some or all of the nonlinear components 114 may be generated randomly. For example, the tuning curve for the nonlinear components 114 may differ as the result of inconsistencies in manufacturing processes. In other cases, the tuning curves for the nonlinear components 114 may be intentionally generated randomly.

In some cases, a random distribution of tuning curves among the nonlinear components 114 of an adaptive sub-module may allow the adaptive sub-module 120 to more easily account for changes in the dynamics or kinematics of sub-system module 124. A random distribution of tuning curves among the nonlinear components 114 may allow the adaptive sub-module 120 to model a broader range of functions. In some cases, the tuning curves for the nonlinear components 114 may be controlled so that the nonlinear components 114 are particularly responsive to certain types of inputs or to generate particular responses.

Each nonlinear component 114 is coupled to the output module 104 by at least one weighted coupling 116. Each weighted coupling 116 has a corresponding connection weight 118. The response from each nonlinear component 114 can be weighted by the connection weights 118 of the corresponding weighted couplings 116. The weighted responses are provided to the output module 104 to form the output modifier.

The output modifier generated by a particular adaptive sub-module 120 may be a sum of the weighted outputs from each of the nonlinear components 114 in that particular adaptive-sub-module 120. In some cases, the output modifier generated by at least one of the adaptive sub-modules 120 may be multidimensional.

Figure 4:
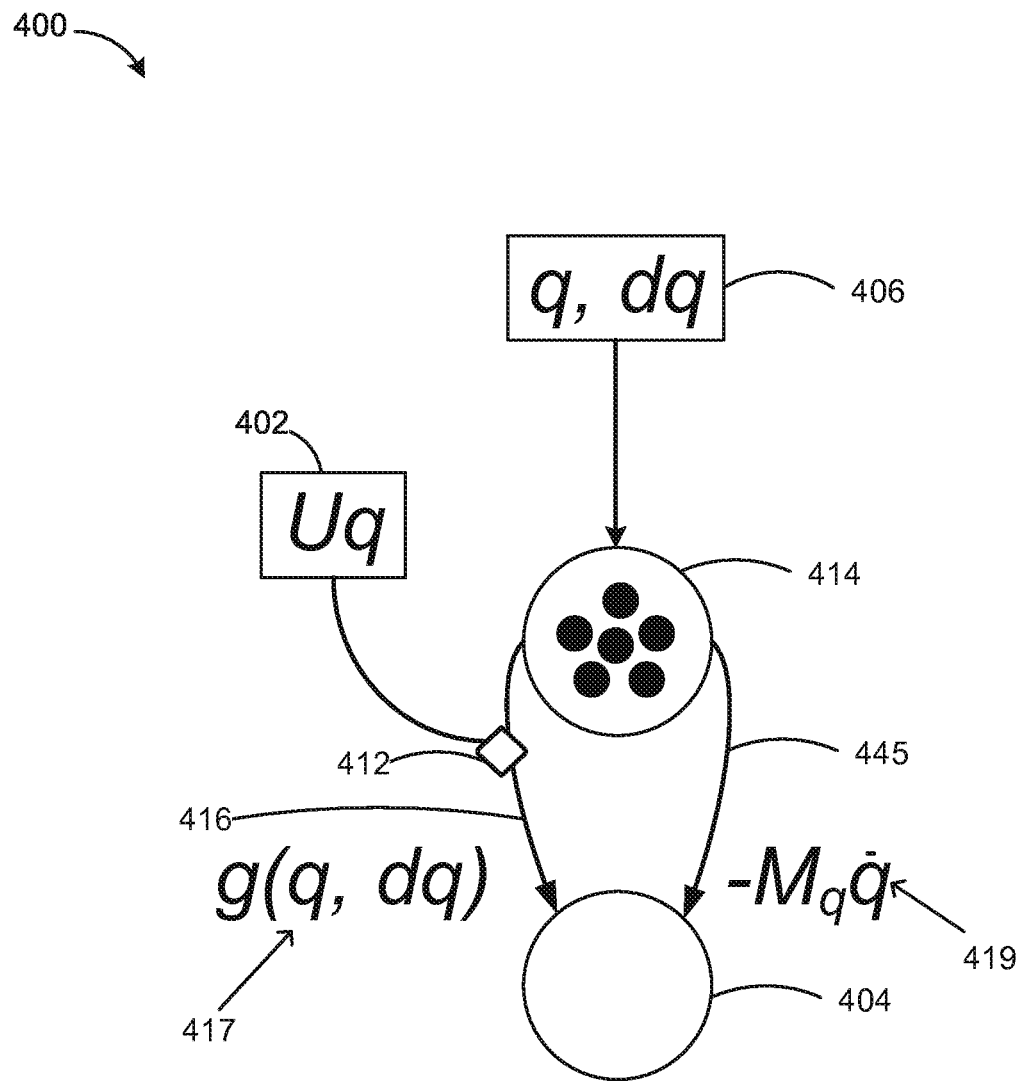
FIG. 4 is a block diagram of a neural implementation of a system for providing adaptive control and/or adaptive predictive filtering with an adaptive bias sub-module in accordance with an example embodiment.

In some cases, the adaptive module 108 may include a bias adaptation sub-module. The bias adaptation sub-module may be configured to provide a bias output modifier to the output module. A bias output modifier may be generated to account for unknown or changing dynamics of the sub-system module 124. In such cases, the output module 104 may be configured to generate the final output by adding the bias output modifier to the initial input. Examples of systems implementing a bias adaptation sub-module are shown in FIGS. 3-5.

Figure 7:
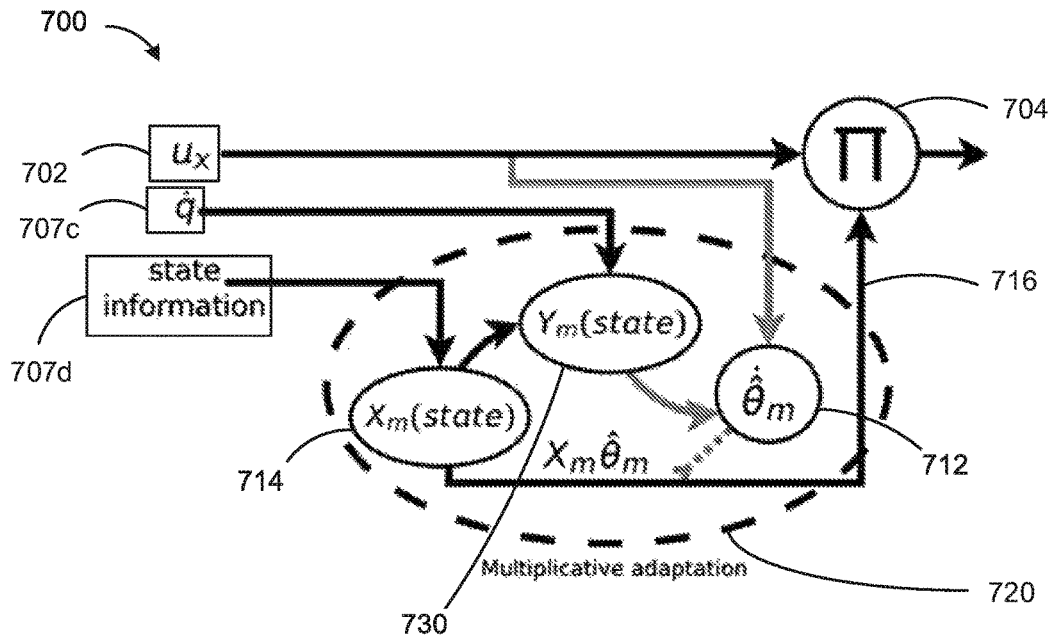
FIG. 7 is a block diagram of another system for providing adaptive control and/or adaptive predictive filtering with an adaptive transformation sub-module in accordance with another example embodiment.
Figure 8:
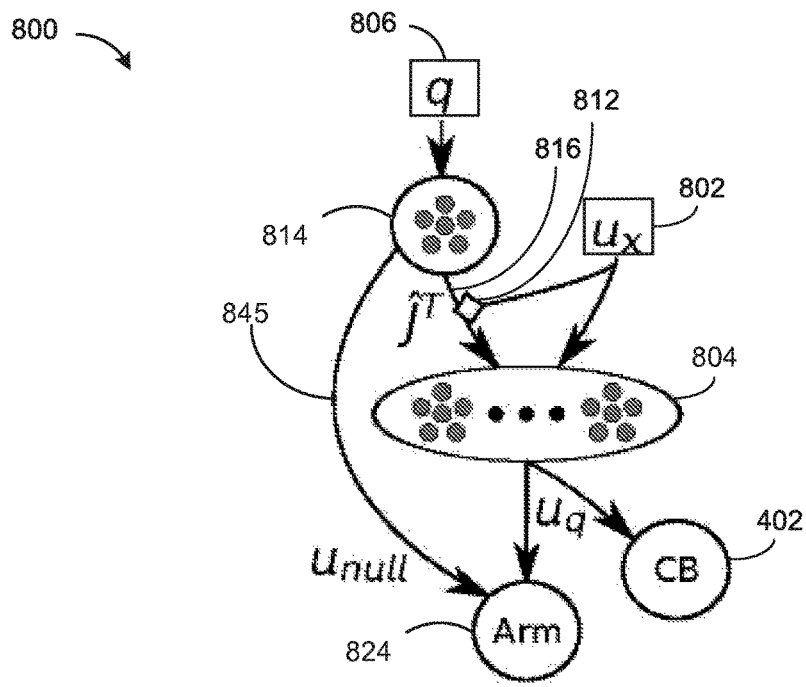
FIG. 8 is a block diagram of a neural implementation of a system for providing adaptive control and/or adaptive predictive filtering with an adaptive transformation sub-module in accordance with an example embodiment.

In some cases, the adaptive module 108 may include a transformative adaptation sub-module. The transformative adaptation sub-module may be configured to provide a transformative output modifier to the output module 108. In such cases, the output module 104 may be configured to generate the final output by multiplying the transformative output modifier and the initial output. Examples of systems implementing a transformative adaptation sub-module are shown in FIGS. 6-8.

In some cases, one or more of the nonlinear components 114 may be coupled to the output module 104 by a plurality of weighted couplings 116. For example, this can be useful where the output modifier generated by the adaptive sub-module 120 is multidimensional.

Accordingly, in some cases at least one of the nonlinear components 114 may be coupled to the output module 104 by a plurality of weighted couplings 116, one weighted coupling for each dimension of the multidimensional output modifier desired. In some cases, each of the nonlinear components 114 may be coupled to the output module 104 by a plurality of weighted couplings 116, one weighted coupling for each dimensions of the multidimensional output modifier. In this case, the scalar output generated by each nonlinear component 114 can be weighted by a separate connection weight 118 for each of the dimensions of the output modifier.

Each adaptive sub-module 120 also comprises a learning module 112. The learning module 112 is configured to update the connection weights 118 for each weighted coupling 116 in that adaptive sub-module 120 based on the initial output. The learning module 112 may determine a parameter update value for each connection weight 118. The learning module 112 can then add the parameter update value to each corresponding connection weight 118 to generate the updated connection weight.

The learning module 112 implemented with a bias adaptation sub-module can be configured to update connection weights 118 based on the initial output and the outputs from the nonlinear components 114. For example, the connection weights 118 may be updated based on an outer product of the initial output and the scalar response from the nonlinear components 114 in that sub-module (as discussed above with regard to equation (7)).

The learning module 112 implemented with a transformative adaptation sub-module can be configured to update the connection weights 118 based on the initial output, the state input and the scalar response from the nonlinear components. For example, in some embodiments the connection weights 118 may be updated based on an outer product of the initial output and a product of the state input and the weighted outputs from the nonlinear components (as discussed above with regard to equation (29)). In other embodiments, the connections weights 118 may be updated based on an outer product of the initial output, the state input and the scalar outputs from the nonlinear components (as discussed above with regard to equation (31)).

In some cases, the learning module 112 may also use incorporate a learning rate parameter that reflects the learning rate of the nonlinear components 114 in that particular adaptive sub-module 120.

In some cases the system 100 may be used to control the operation of a system or device involving the operation of one or more motors, such as a robotic arm. In cases where the operation of the system entails movement of one or more components of the sub-system module 124, the system 100 may further comprise a motor module coupled to the output module 104. The output module 104 may be configured to control operation of the motor module, for example by providing a final control output that controls the operation of various motors in the motor module. In the example of a robotic arm, the final control output may provide one or more control signals to operate the motors associated with each joint in the robotic arm. The embodiments described herein are not limited to controlling motor modules however, and the particular use of the control outputs generated by the output module 104 may depend on the particular applications of the system 100.

In some cases, the system 100 can be used to observe and predict the operation of a sub-system module 124. In such cases, the output module 104 can be configured to provide a predictive output indicating a prediction of a future system state. The output module 104 may be coupled to a predictive module and can provide the predictive output to the predictive module. This predictive output can be used for various purposes, such as tracking the trajectory of an object for example.

In some cases, the system 100 may include a combination of adaptive control and predictive filtering. In such cases, the predictive output generated by output module 104 can be provided to the feedback module 106. This predictive output can be used by feedback module 106 to generate a system state input. In some cases, the feedback module 106 will combine the predictive output with inputs provided by the sensor module 110.

For example, this may be done where system 100 has a fairly accurate predictive model, but there is uncertainty about the accuracy the sensors in sensor module 110. In this case, the system state input provided by the feedback module 106 may be generated to reflect this uncertainty by relying more on the predictive output generated by the output module 104.

Depending on the implementation of system, the desired form of an output modifier may differ. For example, an output modifier generated by a bias adaptation sub-module may be in the form of a vector. The different dimensions of the vector output modifier can be generated by weighting the scalar outputs of the nonlinear components, as discussed above, In some cases, the output modifier generated by a transformative adaptation sub-module may be in the form of a matrix. For example, the transformative output modifier may be generated to approximate a Jacobian transform matrix of the system sub-module 124 that is being controlled or observed. The elements of the matrix can be generated by weighting the scalar outputs of the nonlinear components as discussed above, The manner in which the output modifiers are generated in the present application is in contrast to previous approaches. Previous approaches used nonlinear components that generated responses in the same form as the desired output modifier. A weighted sum of those responses was then used to create the output modifier. The learning was implemented to determine the appropriate weighting for each of the responses. Using that approach, as the dimensionality of the system increased, the number of nonlinear components needed to model the system increased exponentially, In contrast, embodiments of the system described herein use nonlinear components that generate a scalar output, i.e. a one-dimensional output. Each nonlinear component can be associated with a plurality of connection weightings or learned parameters. The output from each nonlinear component can have a different weighting (i.e. independent coefficients or learned parameters) for each dimension of the output modifier being generated. The adaptive sub-modules are configured to determine the weightings for each of these dimensions in order to generate the output modifier.

Accordingly, as the dimensionality of the system increases, no additional nonlinear components are required. Rather the number of connection weightings/learned parameters may increase.

The embodiments of the system described herein also provide additional flexibility over previous approaches. Because the output from each nonlinear component is not required to be in the same form as the output modifier being generated, the system can be implemented using a much wider range of components. Thus, system 100 can be implemented using those components that are the most efficient to implement in hardware.

The various components of the system 100 such as the command module 102, the output module 104, the feedback module 106, the adaptive module 108, the input module 122 and the sensor module 110 can be implemented in hardware in a number of different ways, employing components such as simulated/artificial neurons, FPGAs, GPUs, and other parallel computing systems.

As discussed above, the system 100 can be seeded with a set of connections that carry out a complex function. In this case, the connections between the various components of the system 100 can be determined using the NEF approaches discussed above to implement the desired adaptive functions. Where the system 100 is implemented with neurons, the connection weights between the different populations of neurons representing the various system components can be determined initially.

The adaptation can then implemented by updating the connection weights of the weighted couplings between the nonlinear components in the adaptive sub-modules 120 and the output module 104. In this manner, the connection weights for the system 100 can be initially seeded using the methods of the NEF and the systems and methods described herein allow the system 100 to adapt to any unknown system dynamics and kinematics. That is, the systems and methods describe herein provide a system design that is able to take advantage of the benefits provided by the NEF (initial re-training of the connection weights) while also providing novel approaches for kinematic and dynamic adaptation.

For example, as mentioned above, a transformative adaptation sub-module may be seeded with connection weights that generate a transformation between system spaces that does not take into account the inertia of the system. The transformative adaptation sub-module can then be configured to update the connection weights to account for inertia.

The representation of the adaptive sub-module 120 and the weighted couplings 116 shown in FIG. 1 is merely exemplary. The particular locations and physical configuration of various components such as the learning module 112, the weighted couplings 116 and the connection weights 118 may differ depending on the particular implementation of the system 100. Specific examples of different approaches include the TrueNorth, NeuroGrid and Spinnaker approaches mentioned above.

For example, in some embodiments implementing both the adaptive sub-module 120 and the output module 104 in neurons it may be possible to have a physical coupling between each of the nonlinear components 114 (i.e. neuron) and each neuron in the output module 104. This may require an extensive network of physical connections, which could limit the number of neurons that can be implemented on a physical chip.

Additionally, each of these couplings would have a corresponding connection weight that can be stored or tracked in different ways. The connection weights for each of these couplings could be updated using the methods described herein to generate the desired output modifier. For example, the connection weights for each coupling could be stored in off-board memory. Similarly, off-board electronics could be used to route the signals from each nonlinear component 114 in the adaptive sub-module 120 to the output module 104.

The couplings between the nonlinear components 114 and the output module 104 could also be implemented using traditional digital computing. Any method can be used which effectively takes the outputs from each nonlinear component 114 and multiplies them by a set of connection weights, combining them together into a set of values to be sent to the output module 104. For example, the connection weights could be stored digitally in standard Random Access Memory (RAM) as a set of floating point values which are then multiplied and summed by a Field Programmable Gate Array (FPGA) to produce an output. This could also be performed by a custom Application-specific integrated circuit (ASIC). In another example embodiment, the weighted summation could also be performed using analog circuitry, such as a Field-Programmable Analog Array (FPAA). In some embodiments, it could even be done probabilistically, where the connection weights are treated as probabilities of adding the results together. In this last example embodiment, the system can produce the correct output (i.e. the correct weighted sum) on average over time.

Figure 2:
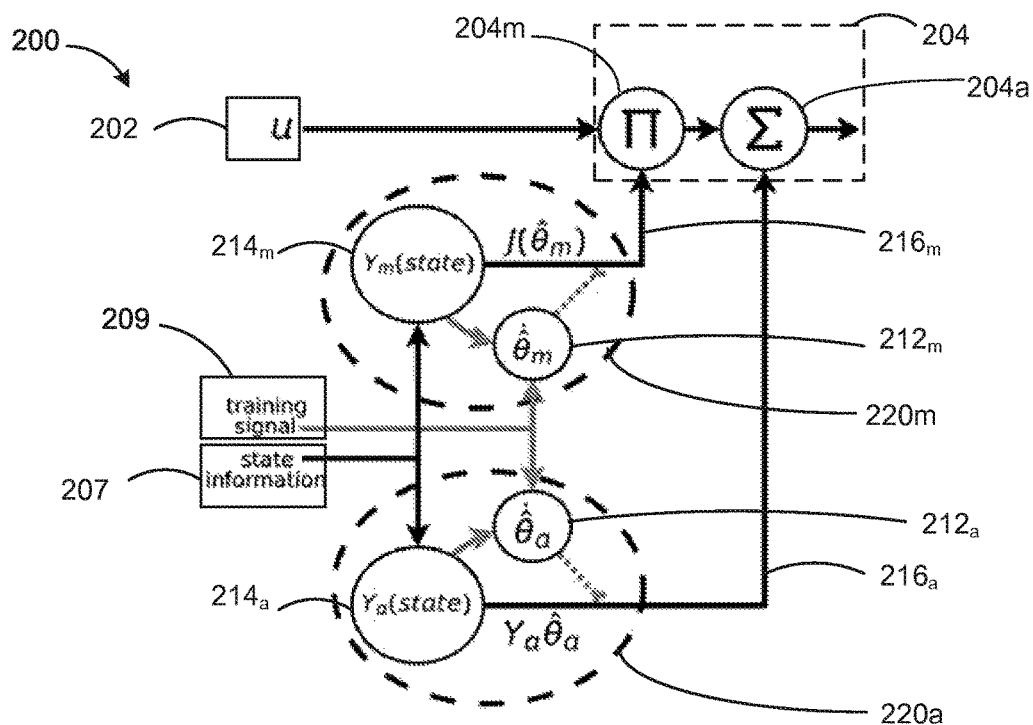
FIG. 2 is a block diagram of another system for providing adaptive control and/or adaptive predictive filtering in accordance with an example embodiment.

Referring now to FIG. 2, shown therein is another example embodiment of a system 200 for providing at least one of adaptive control and adaptive filtering. System 200 includes a command module 202, a transformative adaptation sub-module 220$m$, a bias adaptation sub-module 220$a$ and an output module 204. The output module 204 includes a transformative output sub-module 204$m$ and a bias output sub-module 204$a$.

Within the system 200, there can be one or more adaptive sub-modules 220 that are operable to generate output modifiers that modify or alter i. In some cases, these adaptive sub-modules may be separated into two types: multiplicative/transformative adaptation sub-modules such as transformative adaptation sub-module 220$m$ and additive/bias adaptation sub-modules such as bias adaption sub-module 220$a$. In some cases, one or more of these adaptive sub-modules may be implemented as part of a hierarchy. Similarly, the system 200 may be implemented as part of a hierarchy or chain of systems that contribute to adaptive control or adaptive predictive filtering in a larger system.

The transformative adaptation sub-module 220m includes a plurality of nonlinear components 214m. Each of the nonlinear components 214m is coupled to the transformative output sub-module 204m by at least one weighted coupling 216m. Each weighted coupling 216m has a corresponding connection weight. The transformative adaptation sub-module 220m also includes a learning module 212m configured to update the connection weights of the weighted couplings 216m.

Similarly, the bias adaptation sub-module 220a includes a plurality of nonlinear components 214a. Each of the nonlinear components 214a is coupled to the bias output sub-module 204a by at least one weighted coupling 216a. Each weighted coupling 216a has a corresponding connection weight. The bias adaptation sub-module 220a also includes a learning module 212a configured to update the connection weights of the weighted couplings 216a.

The command module 202 provides an initial output that may be referred to as u that can be an initial control output or an initial predictive output. The initial output forms the basis of the final output, which may also be referred to as the fully adapted output. In some cases, u can be generated as the output of a component at another layer of a hierarchical structure. In some cases, an input may be provided to the command module 202 containing specific information, such as a target location and the command module 202 can generate the initial output u based on the input. In some cases, the command module 202 may also use input from a feedback module to generate the initial output.

Both the transformative adaptation sub-module 220m and the bias adaptation sub-module 220a receive a state input 207. The state input 207 may be received from a feedback module such as the feedback module 106 shown in FIG. 1. The state input 207 represents a current state of the sub-system that is being observed or controlled.

The content of the state input provided to an adaptive sub-module 220 depends on what that sub-module is adapting to. The state inputs 207 may be provided to a plurality of nonlinear components 214, shown as Y, for each adaptive sub-module 220. Each nonlinear component 214 can be configured to generate a scalar output in response to the state input 207. The output of the nonlinear components 214 can be weighted by a set of learned parameters, denoted $\hat{\theta}$. These learned parameters are also be referred to as connection weights.

In a bias adaptation sub-module 220a, the output modifier provided to the output module 204 may be a weighted summation $Y\hat{\theta}$. In a transformative adaptation sub-module 220m, the output modifier may require further processing. In such cases the relevant information from $Y\hat{\theta}$ can be extracted into a Jacobian matrix that is a function of $\hat{\theta}$, denoted $J(\hat{\theta})$. The output modifiers from the bias adaptation sub-module 220a and transformative adaptation sub-module 220m can be formed using the various methods described herein above.

In some cases, the adaptation sub-modules 220 may also receive a training input 209. The training input 209 can be used by the learning modules 212 to update the learned parameters $\hat{\theta}$. In some cases, the learning module 212 may update the learned parameters $\hat{\theta}$ to minimize error if the training input is an error signal. In other cases, the training input may be a reward signal. In such cases, the learning module 212 would determine the update to the learned parameters to maximize the reward.

These are only two examples of many possible training signals. In some cases, no training input may be provided to the learning module 212. The updates may then be determined according to an internally generated function, such as in the case of unsupervised learning.

In some cases, the training input 209 may be received as an input to the system 200. In other cases, the training input 209 may be generated by the command module 202. For example, a training signal can be contained within the initial output generated by the command module. In some cases the training input 209 provided to a transformative adaptation sub-module 214m can be a high-level initial output while the training input 209 provided to a bias adaptation sub-module 214a may be a low-level form of the initial output.

The low-level form of the initial output may be generated using a hierarchy with a fixed transformation to transform the initial output. Alternatively, the low-level initial output can be generated by using a transformative adaptation sub-module as part of a hierarchy that learns the transformation from the high-level system space to the low-level system space.

In the case of an adaptive controller, u can be an initial control output, generated in various ways. For example, the initial control output may be generated using a PD controller. In the case of a predictive filter, u can be an initial prediction output generated in various ways. For example, the initial prediction output may be generated using a linear filter. A skilled reader will appreciate that various other methods may be used to generate an initial control output or initial predictive output.

In some cases, the transformative output modifier provided by a transformative adaptation sub-module 214m may be a transformation that acts like a Jacobian matrix to map or transform the initial output u from a first system space to a second system space. In the example of adaptive control of a robotic arm, this may be transforming an initial control output that specifies some forces to be applied to the robotic hand into a final control output that specifies a set of torques to apply to the joints of the arm.

In some cases, the bias output modifier provided by the bias adaptation sub-module 214a acts to counter external or internally generated forces that may introduce error into the initial control or prediction output. In the case of predicting the trajectory of a projectile, this could be an external force like wind or a force introduced from improper internal models of the mass of the object.

Using the neural coding methods described herein, various components of the system 200 can be implemented in any nonlinear distributed system, such as a neural network.

Referring now to FIG. 4, shown therein is an example embodiment of a system 400 for providing adaptive control. The system 400 shown in FIG. 4 is an example of an implementation of a system with an adaptive bias sub-module implemented using spiking neurons as the nonlinear components 414. In the example shown in FIG. 4, the output module 404 can be coupled to a motor module that controls a three-link nonlinear robotic arm.

System 400 includes a feedback module 406 configured to provide a system state input. In the example shown in FIG. 4, the system state input provided by feedback module 406 indicates the current position and velocity of a robotic arm. The system state input is provided to the nonlinear components 414. The nonlinear components 414 are a population of neurons configured to generate a scalar output in response to the state input.

The nonlinear components 414 are coupled to the output module 404 by weighted couplings 416 and secondary couplings 445. As shown in FIG. 4, a learning module 412 is configured to adjust the connection weightings of the weighted couplings 416 using a low-level command input $u_g$ from the command module 402. The connection weights are adjusted by the learning module, so that the weighted outputs of the nonlinear components 414 provide the bias output modifier 417. The bias output modifier 417 is an adaptive signal that corrects for unmodeled dynamics of the system being controlled or observed. The connection weights can be adjusted using the methods described herein above, for example using equation (7).

In addition, the nonlinear components 414 are configured to generate scalar outputs to account for the effects of the system's inertia. The nonlinear components 414 generate inertial output modifiers 419 in response to the system state input provided by the feedback module 406. The inertial output modifiers 419 are provided directly to the output module 404 by secondary couplings 445. The output module 404 can use the inertial output modifiers 419 to cancel out the effects of inertia on the system.

In embodiments of system 400 implemented in neurons, the bias output modifier 417 and the inertial output modifier 419 can be provided directly to the system sub-module being controlled. As mentioned above, providing multiple inputs to a neuron population can act as an addition operation on those two inputs. Providing the initial output to the system sub-module under control as well as the output modifiers 417 and 419 will add the output modifiers to the initial output. Thus, the output modifiers can account for the effects of the system dynamics and inertia.

Referring now to FIGS. 9A and 9B, shown therein are the results of applying an output modifier generated by a bias adaptation sub-model to a simulated system where external forces were not accounted for by the initial output generated by the command module.

FIG. 9A shows an illustration of a simulated system controlling a three-link arm attempting to move the hand of the arm to a set of targets from a center starting point while a perturbing force field is being applied to the hand. In the example shown in FIG. 9A, the size of the force field applied was based on the velocity of the hand. The actual path 910 represents the movement of the hand in the force field without adaptation in comparison with the desired path 905.

FIG. 9B shows an illustration of the same system for controlling a three-link arm from FIG. 9A except with a bias adaptation sub-module added that includes 1,000 rate based neurons as the nonlinear components. The path 955 is the result of the first trial with the bias adaptation sub-module added, showing immediate error correction.

Referring now to FIGS. 10A and 10B, shown therein are plots showing the simulated path of a robotic arm performing a reach-out task while a perturbing force field is being applied based on the angular velocity of the joints.

FIG. 10A illustrates the performance of the robotic arm without a bias adaptation sub-module. The actual path 1010 is the movement of the robotic arm in the force field without adaptation while attempting to travel the desired path 1005.

FIG. 10B illustrates the performance of the robotic arm from FIG. 10A with a bias adaptation sub-module added that uses 1,000 rate based neurons as the nonlinear components. The actual path 1055 is the result from the first trial with the bias adaptation sub-module, showing immediate error correction.

Figure 11B:
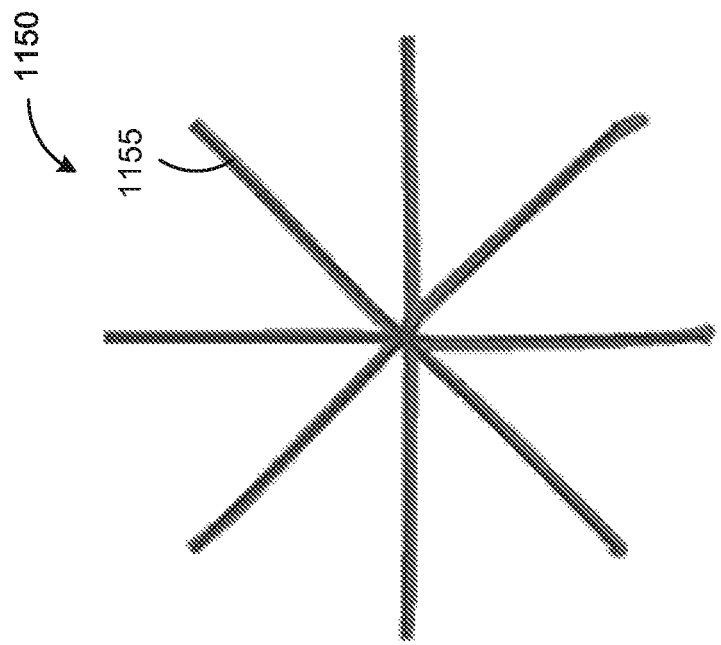
FIG. 11B is an illustration of a plot showing the simulated path of a robotic arm performing a reach-out task with inaccurate inertia matrices for limb segments with an adaptive module implemented in accordance with an embodiment.
Figure 11A:
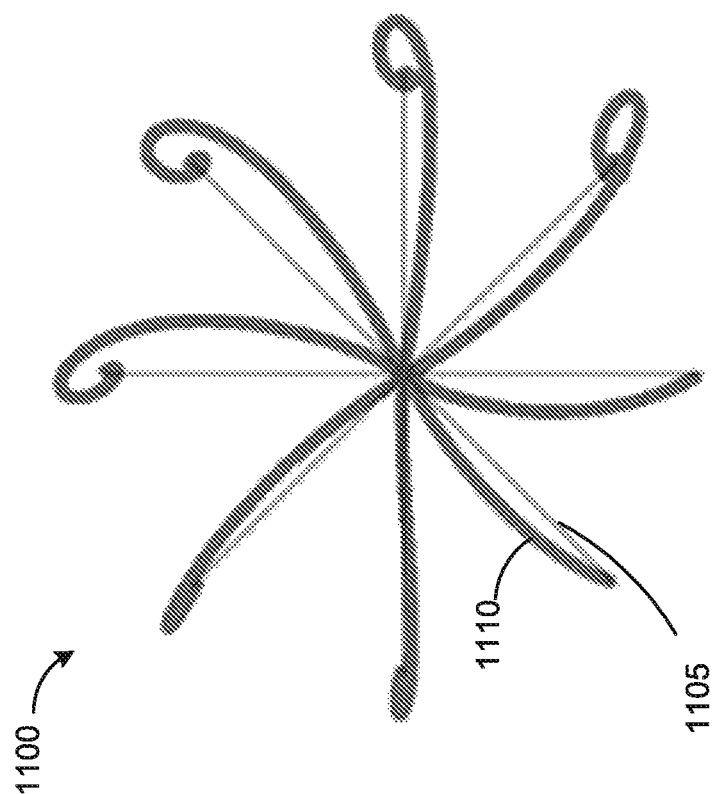
FIG. 11A is an illustration of a plot showing the simulated path of a robotic arm performing a reach-out task with inaccurate inertia matrices for limb segments without an adaptive module.

Referring now to FIGS. 11A and 11B, shown therein are plots illustrating the simulated path of a robotic arm performing a reach-out task with inaccurate internal models of the inertia matrices for limb segments.

FIG. 11A illustrates the performance of the arm without a bias adaptation sub-module. The robotic arm takes an indirect path 1110 to reach the target, as compared with the desired path 1105.

FIG. 11B illustrates the performance of the same system with a bias adaptation sub-module where the nonlinear components consist of 20,000 rate based neurons. The robotic arm travels along the path 1155 in the first trial with the bias adaptation sub-module applied, showing immediate error compensation.

In each of the examples shown in FIGS. 9-11, the system is able to immediately compensate for errors in movement when the bias adaptation sub-module is implemented. The bias adaptation sub-module is able to account for errors introduced by both external forces and inaccurate internal models and allow the robotic arm to move to the targets in a straight or nearly straight line.

Referring now to FIG. 7, shown therein is an example embodiment of a system 700 for providing at least one of adaptive control and adaptive predictive filtering. System 700 is shown with a transformation adaptation sub-module 720 configured to provide a transformative output modifier to the output module 704. System 700 also comprises a command module 702 and an output module 704.

System 700 is an example embodiment of the second form of the transformative adaptation sub-module 720 described above with reference to equations (30)-(31). The adaptive sub-module 720 includes a plurality of nonlinear components 714. Each of the nonlinear components 714 is coupled to the output module 704 by at least one weighted coupling 716. Each weighted coupling 716 has a corresponding connection weight. The adaptive sub-module 720 also comprises a learning module 712 configured to update the connection weight of each weighted coupling 716 and a plurality of nonlinear learning components 730.

Each of the nonlinear components 714 can generate a scalar output in response to state information input 707$d$. The scalar outputs can be weighted by the corresponding connection weights and provided to the output module 704 as an output modifier. The scalar outputs from the nonlinear components 714 can also be provided to nonlinear learning components 730. Nonlinear learning components 730 can also receive state velocity information 707$c$. Both the state information 707$d$ and state velocity information 707$c$ may be provided to system 700 by a feedback module such as feedback module 106.

The nonlinear learning components 730 can generate a parameter update value using the outputs from the nonlinear components 714 and the state velocity information. The parameter update value may be an outer product of the scalar outputs and the state velocity information. The parameter update input can then be provided to the learning module 712 to be used in updating the connection weights.

The learning module 712 also receives as an input the initial output provided by the command module 702. The learning module 712 can update the connection weights of the weighted couplings 716 using the initial output and the parameter update value. The learning module 712 may update the connection weights using an outer product of the parameter update value (i.e. the outer product of the scalar outputs and the system state input) and the initial output (as shown in equation 31 above). In some cases, the learning module 712 may also use a learning rate parameter corresponding to the nonlinear components 714 to update the connection weights.

In an example implementation, system 700 can be implemented on a 2-link robotic arm, where an initial control output is provided in terms of hand (x,y) forces. The initial control output can be provided to the output module 704. The output module 704 can be configured to transform the initial control signal from the end-effector Cartesian space to joint-space using the output modifier from the adaptive sub-module 720.

In some cases, the connection weights of the weighted couplings 716 are initially seeded to provide an estimate of the Jacobian transform between end-effector Cartesian space and joint-space for the system sub-module being controlled. In some cases the initial transformation may not be accurate. To account for this, the adaptive sub-module 720 can be configured to learn the kinematics for the system sub-module online.

The adaptive sub-module 720 may receive as state inputs the joint angles of the system and the initial control output in (x, y) space for the learning module 712. Each of the nonlinear components 714 can generate a scalar output in response to the system state input provided (here the joint angles). The scalar outputs can then be weighted by the connection weights of the corresponding weighted couplings 716. The learning module 712 can be configured to learn the mass matrix using the outputs from the nonlinear components 714 and the initial control output as described above with reference to equations (29) and (31). The learning module 712 updates the connection weights such that the output modifier provided by the adaptive sub-module 720 is a transformation that accounts for the correct mass matrix of the system.

Figure 12A:
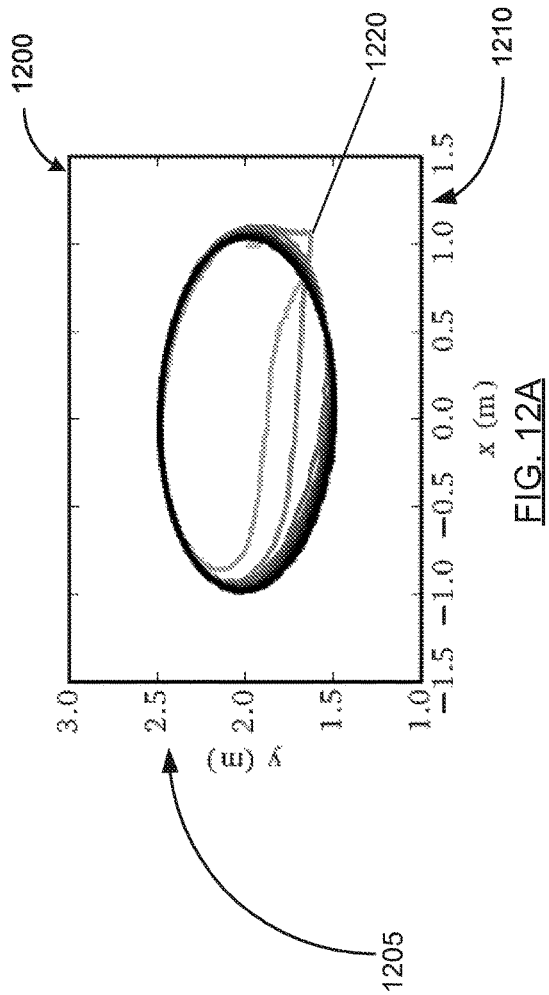
FIG. 12A is an illustration of a plot showing the simulated path of a robotic hand learning to trace an ellipse with an adaptive module implemented in accordance with an embodiment.

Referring now to FIG. 12A, shown therein is a plot 1200 illustrating the simulated path of a robotic hand learning to trace an ellipse with its position traced along the x-axis 1210 and y-axis 1205. In the example shown in FIG. 12A, the system controlling the robotic hand was implemented with a transformation adaptation sub-module. Actual path 1220 illustrates the path of the robotic hand as the system learns to move correctly. In plot 1200, the actual path 1220 gets darker over time as the system learns how to move, such that actual path 1220 begins to more closely resemble an ellipse.

Figure 12C:
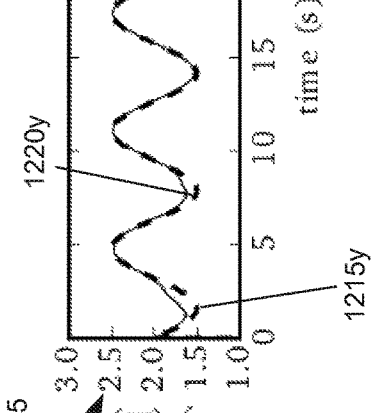
FIG. 12C is an illustration of a plot showing the position along the y-axis of the robotic hand of FIG. 12A as compared with a target position.
Figure 12B:
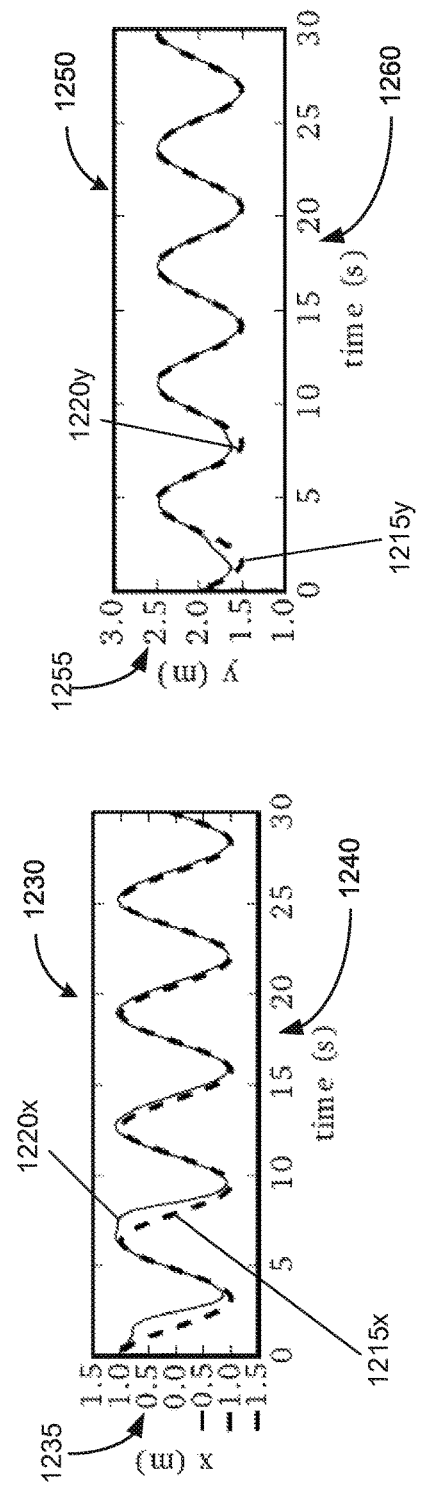

In the example shown in FIGS. 12A-12C, the system is controlling a 3-link robotic arm. The system is seeded with connection weights for a Jacobian transform based on each arm segment being of length 3, when the actual values are 2, 1.2, and 0.7. The system then updates the connection weights to adjust the transformative output modifier to account for the correct values.

Referring now to FIG. 12B, shown therein is a plot 1230 illustrating the actual position 1220x of the robotic arm from FIG. 12A along the x-axis 1235 over time 1240. As shown in FIG. 12B, the actual position 1220x begins to track the target position 1215x as the system learns the correct parameters of the transformation from the high-level Cartesian space to the end-effector space.

Referring now to FIG. 12C, shown therein is a plot 1250 illustrating the actual position 1220y of the robotic arm from FIG. 12A along the y-axis 1255 over time 1260. Similar to FIG. 12B, the actual position 1220y becomes must closer to the target position 1215y as the system learns the parameters of the transformation over time.

Figure 13:
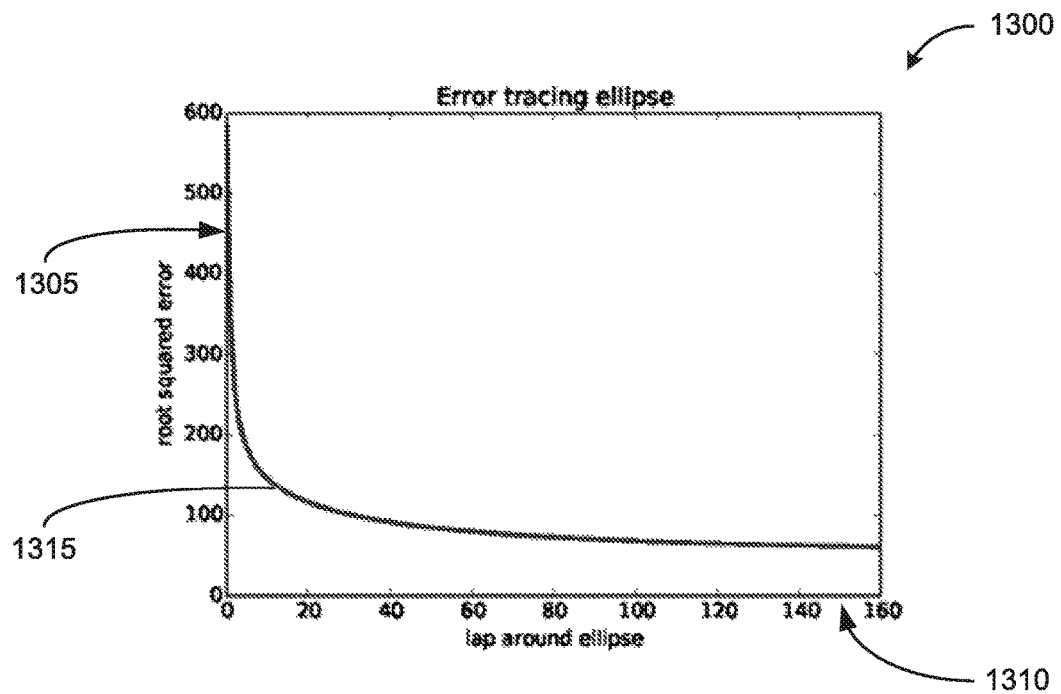
FIG. 13 is a diagram illustrating a plot of the root-squared error for the simulated learning illustrated in FIG. 12.

Referring now to FIG. 13, shown therein is a plot 1300 illustrating the root-squared error of the arm motion shown in FIGS. 12A-12C. Axis 1305 shows the root-squared error measuring the difference from perfect tracing for each lap around the ellipse, shown on Axis 1310. As shown by error line 1315, the system, using a transformation adaptation sub-module implemented in neurons as described herein, is able to very quickly learn an approximation of the transformation between spaces. This approximation is continually refined to further reduce error as it continues practicing.

Referring now to FIG. 8, shown therein is an example embodiment of a system 800 for providing adaptive control. System 800 is an example embodiment where each of the command module 802, feedback module 806, output module 804 and adaptive sub-module are implemented in neurons. Feedback module 806 provides a system state input to a plurality of nonlinear components 814 that are implemented as a population of neurons. Each of the nonlinear components 814 generates a scalar output in response to the system state input.

Each of the nonlinear components 814 is coupled to the output module 804 by at least one weighted coupling 816. Each weighted coupling 816 has a corresponding connection weighting. A learning module 812 is configured to update the connection weights for each of the weighted couplings 816.

The learning module 812 receives the outputs generated by the nonlinear components 814 as well as the initial output, $u_x$, provided by the command module 802. The learning module 812 can update the connection weights of the weighting couplings 816 using the outputs from the nonlinear components 814 and the initial output in various ways as described herein, in particular with reference to equations (29) and (31). In system 800, the learning module 812 is configured to adjust the connection weights of the weighted couplings 816 so that the weighted outputs from the nonlinear components 814 are approximating a Jacobian transform from a first system space to a second system space.

The scalar outputs from the nonlinear components 814 are weighted by the connection weights and provided to the output module 804 as an output modifier, in this case an approximate Jacobian transform. The output module 804 also receives the initial output from the command module 802. The output module 804 is configured to transform the initial output from a first system space to a second system space using the approximated Jacobian transform.

The output module 804 comprises a plurality of neuron populations (a neural array) configured to apply the Jacobian output modifier to the initial output received from the command module 802. The output module 804 neural array can be configured to perform a dot product operation between the Jacobian output modifier and the initial output to generate the final output.

The final output can then be provided by the output module 804 to the system sub-module 824 being controlled. In the example shown in FIG. 8, the system sub-module 824 is controlling a robotic arm. Thus, the final output is a low-level control output, $u_g$ configured to control motors that operate the joints of the robotic arm.

The final output $u_g$ can also be provided by the output module 804 as an input to the command module 402 shown in FIG. 4. The low-level control signal can then be used in the bias adaptation process described with reference to FIG. 4. This is one example of how the various adaptive systems described herein can be combined and used in a hierarchical manner. For example, the system 800 could also be implemented to perform the function of the hierarchy 525 discussed above with reference to FIG. 5.

In system 800, the nonlinear components 814 can also be coupled to the system sub-module 824 by secondary couplings 845. The secondary couplings 845 allow the nonlinear components 845 to provide a secondary control output to the system sub-module 824. The secondary control output can be configured to maintain the system sub-module 824 close to its resting position during movement. The secondary couplings 845 can be determined so as to generate the secondary control output, $u_{null}$ based on operational space control methods (see for example Khatib, "A unified approach for motion and force control of robot manipulators: The operational space formulation" *Robotics and Automation, IEEE Journal of,* 3(1):43-53, 1987). This secondary control output may assist in minimizing energy usage by enabling movement of the system while remaining as close to a default resting position as possible, As mentioned above, system 100 can also be implemented to perform adaptive predictive filtering. A system for adaptive predictive filtering can be implemented simply by changing the inputs provided to the system. The nonlinear adaptation described herein greatly extends the predictive power of the system over previous approaches that used linear adaptation, such as Kalman filters implemented in neurons.

Figure 14:
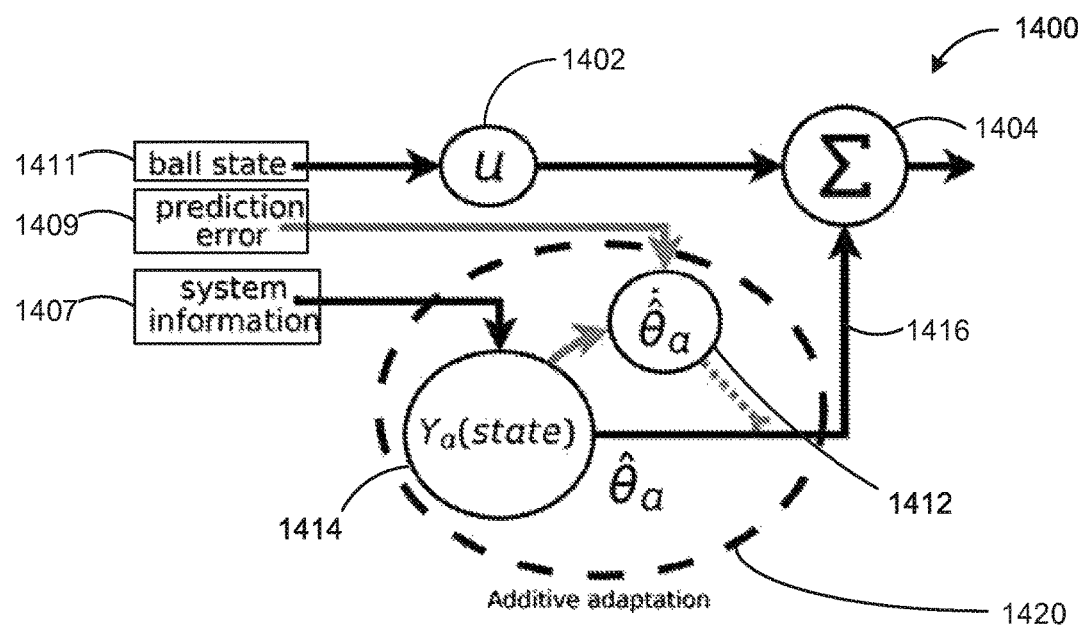
FIG. 14 is a block diagram of a system for providing predictive filtering in accordance with an example embodiment.

The use of transformation adaptation sub-modules allows the initial output to be transformed into another state space for processing. This may be useful in an example embodiment to learn to abstract out the end-effector position of a robotic arm given only joint angles. In such an embodiment, a bias adaptation sub-module could allow the system to account for nonlinear forces acting on the robotic arm, such as the effects of inertia between arm segments or some nonlinear perturbation such as wind, Referring now to FIG. 14, shown therein is an example embodiment of a system 1400 for providing adaptive predictive filtering. System 1400 includes a command module 1402, an output module 1404 and an adaptive sub-module 1420. The command module 1402 receives a state input 1411 representing a current state of the system being observed and generates an initial predictive output.

The adaptive sub-module 1420 includes a plurality of nonlinear components 1414. Each of the nonlinear components 1414 is coupled to the output module 1404 by at least one weighted coupling 1416. Each weighted coupling has a corresponding connection weight. Each nonlinear component 1414 receives as input the system state information 1407 and generates a scalar output in response. The scalar outputs from each of the nonlinear components 1414 are weighted by the connection weights of the corresponding weighted couplings 1416 and provided to the output module 1404 as an output modifier.

The adaptive sub-module 1420 also includes a learning module 1412 configured to update the connection weights. The learning module 1412 receives as input the prediction error 1409 and the outputs from the nonlinear components 1414. The learning module 1412 uses these inputs to update the connections weights in the various ways described herein.

The output module 1404 generates a final predictive output by modifying the initial output using the output modifier received from the nonlinear components 1414. The final predictive output can then be used for various purposes, such as tracking the predicted state of a system being observed, or as an input to a feedback module used for providing adaptive control of the system.

In one example, the system 1400 could be used to track the position of a ball 20 time steps ahead. In this example, the input signal provided to the command module 1402 would include the ball position and velocity. The command module could then generate an initial prediction output u as position+20(dt)(velocity). In different embodiments, the initial prediction output can be calculated internally (as shown in FIG. 14) or the initial prediction output can be determined externally and provided to the system 1400, The bias adaptation sub-module 1420 receives an error signal from prediction error 1409 every 20 time steps. The nonlinear components 1414 receive a constant signal input to generate the scalar responses used to provide the output modifier. The learning module 1412 uses the prediction error to update the connection weights corresponding to the weighted couplings 1416. The output modifier is then provided to output 1404 for use in generating the final predictive output from the initial predictive output.

Figure 15:
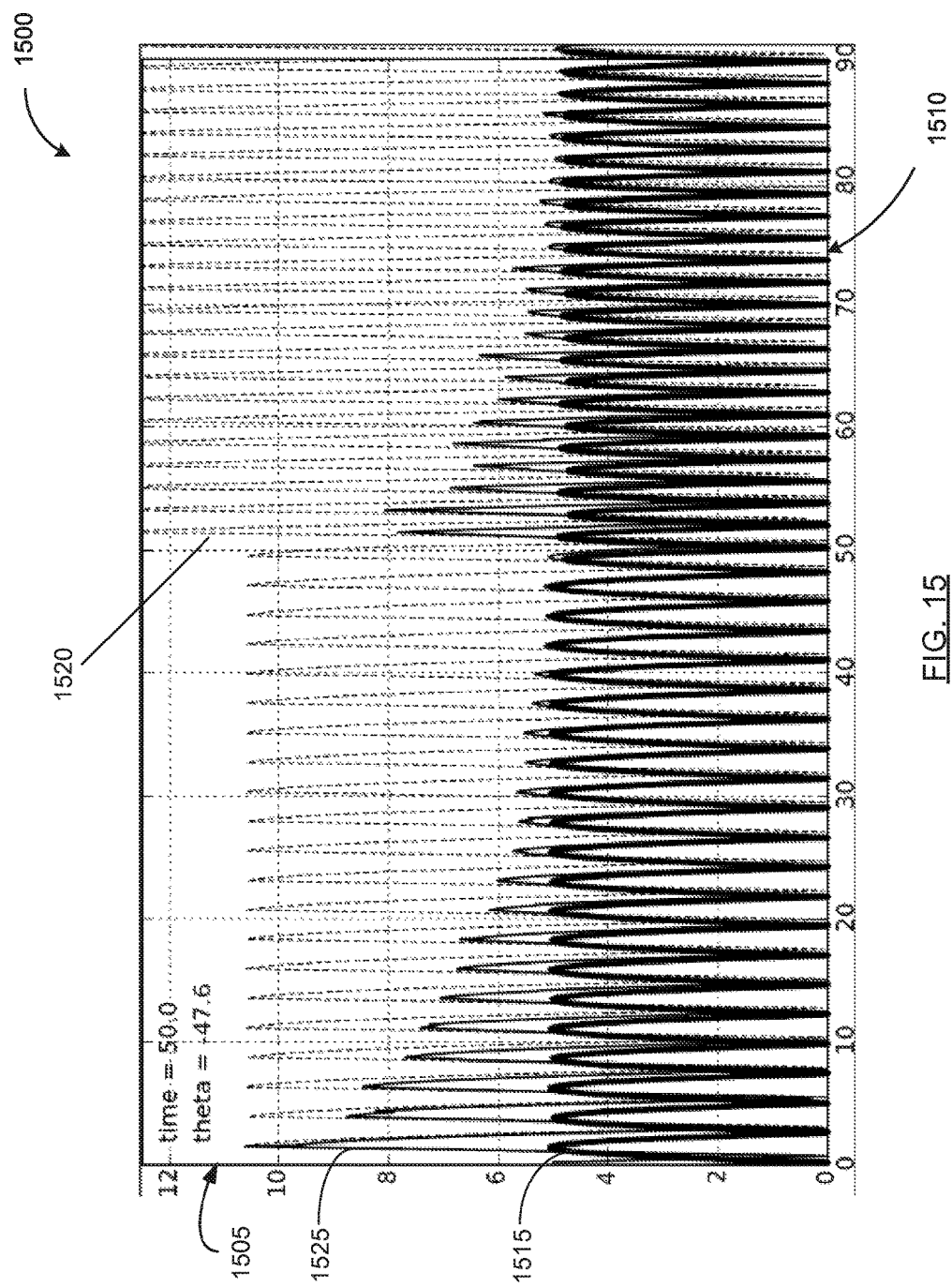
FIG. 15 is a diagram illustrating a plot of tracking the path of a ball using a system for providing predictive filtering with an adaptive bias sub-module implemented in accordance with an embodiment.

Referring now to FIG. 15, shown therein is a plot 1500 illustrating the results of simulated ball tracking performed by system 1400. Plot 1500 shows the actual and predicted height of the ball along axis 1505 for a time period shown along axis 1510. The actual trajectory 1515 of the ball remains relatively consistent for 50 seconds, at which point the dynamics of the ball are changed such that the ball is heavier and bounces faster.

Initial predictive output 1520 does not provide an accurate prediction of the actual trajectory 1515. Initial predictive output 1520 is an example of a predictive output that has not been adapted to account for inaccuracies in the system dynamics or kinematics. Final predictive output 1525 shows the ball trajectory that is predicted using the output modifier generated by the bias adaptation sub-module 1420. By 50 seconds, the system 1400 has learned the dynamics of the ball and after the dynamics are changed, the system 1400 is able to learn to compensate for the change online, quickly adjusting its prediction to be accurate once again.

The present invention has been described here by way of example only. Various modification and variations may be made to these exemplary embodiments without departing from the spirit and scope of the invention, which is limited only by the appended claims.

We claim:

1. An adaptive controller for a system, the controller comprising:

a command module configured to provide an initial control output signal, wherein the initial control output signal is usable to define the operation of the system;

an output module coupled to the command module;

a feedback module configured to provide a system state input; and an adaptive module coupled to the command module and the feedback module, the adaptive module comprising at least one adaptive sub-module coupled to the output module, each adaptive sub-module being configured to provide an output modifier to the output module;

wherein each adaptive sub-module comprises a plurality of nonlinear components, wherein each nonlinear component is configured to generate a scalar output in response to the system state input and is coupled to the output module by at least one weighted coupling, each weighted coupling has a corresponding connection weight;

the scalar output from each nonlinear component is weighted by the connection weights of the corresponding weighted couplings and the weighted outputs are provided to the output module to form the output modifier;

each adaptive sub-module further comprises a learning module configured to update the connection weights for each weighted coupling in that adaptive sub-module based on the initial control output signal, the learning module being configured to receive the initial control output signal from the command module and to determine the update to the connection weights using the initial control output signal;

the at least one adaptive sub-module comprises a particular adaptive sub-module configured to account for changes in one of the system dynamics and the system kinematics; and the learning module for the particular adaptive sub-module is configured to update the connection weights for each weighted coupling in that adaptive sub-module so that the output modifier from that particular adaptive sub-module is usable to modify the initial control output signal to account for the changes in the one of the system dynamics and the system kinematics; and the output module is configured to:

generate a final control output signal by modifying the initial control output signal using the output modifiers, and transmit the final control output signal to the system, wherein the operation of the system is defined by the final control output signal.

2. The controller of claim 1, wherein for each adaptive sub-module the output modifier is a sum of the weighted outputs from each of the nonlinear components.

3. The controller of claim 1, wherein the at least one adaptive sub-module comprises a bias adaptation sub-module configured to provide a bias output modifier to the output module; and the output module is configured to generate the final control output signal by adding the bias output modifier to the initial output.

4. The controller of claim 3 wherein the learning module of the bias adaptation sub-module is configured to update connection weights based on the initial control output signal and the outputs generated by the nonlinear components.

5. The controller of claim 4 wherein the learning module of the bias adaptation sub-module is configured to update the connection weights based on an outer product of the initial control output signal and the scalar outputs from the nonlinear components.

6. The controller of claim 1, wherein the at least one adaptive sub-module comprises a transformative adaptation sub-module configured to provide a transformative output modifier to the output module; and modifying the initial control output signal comprises a multiplication using the transformative output modifier.

7. The controller of claim 6 wherein:

the initial control output signal defines a control signal in a first system space that is defined in relation to the operation of the system;

the multiplication using the transformative output modifier transforms the final control output signal to a second system space; and the second system space is also defined in relation to the operation of the system.

8. The controller of claim 6, wherein the transformative adaptation sub-module is configured to provide the transformative output modifier directly, based on the weighted outputs from the nonlinear components.

9. The controller of claim 6, wherein the learning module of the transformative adaptation sub-module is configured to update connection weights based on the initial control output signal, the state input and the outputs from the nonlinear components.

10. The controller of claim 9, wherein the learning module of the transformative adaptation sub-module is configured to update connection weights based on an outer product of the initial control output signal and a product of the system state input and the weighted outputs from the nonlinear components.

11. The controller of claim 9, wherein the learning module of the transformative adaptation sub-module is configured to update connection weights based on an outer product of the initial control output signal, the system state input and the scalar outputs from the nonlinear components.

12. The controller of claim 1, wherein the system comprises a motor module coupled to the output module; and wherein the final control output signal is a motor control output signal configured to control operation of the motor module.

13. The controller of claim 1, wherein the nonlinear components are neurons.

14. The controller of claim 13, wherein the neurons are spiking neurons.

15. The controller of claim 1, wherein at least one of the command module, the output module and the feedback module are implemented in neurons.

16. The controller of claim 15, wherein each of the command module, the output module and the feedback module is implemented in neurons.

17. The controller of claim 1, wherein each nonlinear component has a tuning curve that determines the scalar output generated by the nonlinear component in response to any input and the tuning curve for each nonlinear component is generated randomly.

18. The controller of claim 1, wherein the output modifier generated by at least one of the adaptive sub-modules is multidimensional.

19. The controller of claim 18, wherein at least one of the nonlinear components in the adaptive sub-module that generates the multidimensional output modifier is coupled to the output module by a plurality of weighted couplings, one weighted coupling for each dimension of the multidimensional output modifier.

20. The controller of claim 19, wherein each of the nonlinear components in the adaptive sub-module that generates the multidimensional output modifier is coupled to the output module by a plurality of weighted couplings, one weighted coupling for each dimension of the multidimensional output modifier.

21. An adaptive controller for a system, the controller comprising:

a command module configured to provide an initial control output signal wherein the initial control output signal is usable to define the operation of the system;

an output module coupled to the command module;

a feedback module configured to provide a system state input; and an adaptive module coupled to the command module and the feedback module, the adaptive module comprising at least one adaptive sub-module coupled to the output module, each adaptive sub-module being configured to provide an output modifier to the output module;

wherein each adaptive sub-module comprises a plurality of nonlinear components, each nonlinear component is configured to generate a response to the system state input and is coupled to the output module by at least one weighted coupling, and each weighted coupling has a corresponding connection weight;

the response from each nonlinear component is weighted by the connection weights of the corresponding weighted couplings and the weighted responses are provided to the output module to form the output modifier;

each adaptive sub-module further comprises a learning module configured to update the connection weights for each weighted coupling in that adaptive sub-module based on the initial control output signal, the learning module being configured to receive the initial control output signal and to determine the update to the connection weights using the initial control output signal; and the output module is configured to:
generate a final control output signal by modifying the initial control output signal using the output modifiers; and
transmit the final control output signal to the system, wherein the operation of the system is defined by the final control output signal;

further wherein
the at least one adaptive sub-module comprises a transformative adaptation sub-module configured to provide a transformative output modifier directly using the weighted responses from the nonlinear components;
the initial control output signal defines a control signal in a first system space that is defined in relation to the operation of the system;
modifying the initial control output signal using the transformative output modifier transforms the final control output signal to a second system space; and
the second system space is also defined in relation to the operation of the system.

22. The controller of claim 21 wherein the output module is configured to generate the final control output signal by multiplying the transformative output modifier and the initial control output signal.

23. An adaptive filter for a system, the adaptive filter comprising:
a command module configured to provide an initial future system state estimate, wherein the initial future system state estimate is usable to define a future system state input for a future point in time;
an output module coupled to the command module;
a feedback module configured to provide a system state input to the system, wherein the system uses the system state input in controlling the operation of the system; and
an adaptive module coupled to the command module and the feedback module, the adaptive module comprising at least one adaptive sub-module coupled to the output module, each adaptive sub-module being configured to provide an output modifier to the output module;
wherein
each adaptive sub-module comprises a plurality of nonlinear components, wherein each nonlinear component is configured to generate a scalar output in response to the system state input and is coupled to the output module by at least one weighted coupling, each weighted coupling has a corresponding connection weight;
the scalar output from each nonlinear component is weighted by the connection weights of the corresponding weighted couplings and the weighted outputs are provided to the output module to form the output modifier;
each adaptive sub-module further comprises a learning module configured to update the connection weights for each weighted coupling in that adaptive sub-module based on the initial future system state estimate, the learning module being configured to receive the initial future system state estimate and to determine the update to the connection weights using the initial future system state estimate;

the at least one adaptive sub-module comprises a particular adaptive sub-module configured to account for changes in one of the system dynamics and the system kinematics; and the learning module for the particular adaptive sub-module is configured to update the connection weights for each weighted coupling in that adaptive sub-module so that the output modifier from that particular adaptive sub-module is usable to modify the initial future system state estimate to account for the changes in the one of the system dynamics and the system kinematics; and the output module is configured to:
generate a final future system state estimate by modifying the initial future system state estimate using the output modifiers, and
transmit the final future system state estimate to the feedback module, wherein the feedback module uses the final future system state estimate to define the future system state input for the future point in time.

24. The adaptive filter of claim 23, wherein the system state input comprises the final future system state estimate from a previous point in time.

25. The adaptive filter of claim 23, wherein for each adaptive sub-module the output modifier is a sum of the weighted outputs from each of the nonlinear components.

26. The adaptive filter of claim 23, wherein the at least one adaptive sub- module comprises a bias adaptation sub-module configured to provide a bias output modifier to the output module; and
the output module is configured to generate the final future system state estimate by adding the bias output modifier to the initial future system state estimate.

27. The adaptive filter of claim 26 wherein the learning module of the bias adaptation sub-module is configured to update connection weights based on the initial future system state estimate and the outputs generated by the nonlinear components.

28. The adaptive filter of claim 27 wherein the learning module of the bias adaptation sub-module is configured to update the connection weights based on an outer product of the initial future system state estimate and the scalar outputs from the nonlinear components.

29. The adaptive filter of claim 23, wherein the at least one adaptive sub- module comprises a transformative adaptation sub-module configured to provide a transformative output modifier to the output module; and
modifying the initial future system state estimate comprises a multiplication using the transformative output modifier.

30. The adaptive filter of claim 29 wherein:
the initial future system state estimate defines a system state estimate in a first system space that is defined in relation to the operation of the system;
the multiplication using the transformative output modifier transforms the final future system state estimate to a second system space; and
the second system space is also defined in relation to the operation of the system.

31. The adaptive filter of claim 29, wherein the transformative adaptation sub- module is configured to provide the transformative output modifier directly, based on the weighted outputs from the nonlinear components.

32. The adaptive filter of claim 29, wherein the learning module of the transformative adaptation sub-module is configured to update connection weights based on the initial future system state estimate, the system state input and the outputs from the nonlinear components.

33. The adaptive filter of claim 32, wherein the learning module of the transformative adaptation sub-module is configured to update connection weights based on an outer product of the initial future system state estimate and a product of the system state input and the weighted outputs from the nonlinear components.

34. The adaptive filter of claim 32, wherein the learning module of the transformative adaptation sub-module is configured to update connection weights based on an outer product of the initial future system state estimate, the system state input and the scalar outputs from the nonlinear components.

35. The adaptive filter of claim 23, wherein the nonlinear components are neurons.

36. The adaptive filter of claim 35, wherein the neurons are spiking neurons.

37. The adaptive filter of claim 23, wherein at least one of the command module, the output module and the feedback module are implemented in neurons.

38. The adaptive filter of claim 37, wherein each of the command module, the output module and the feedback module is implemented in neurons.

39. The adaptive filter of claim 23, wherein each nonlinear component has a tuning curve that determines the scalar output generated by the nonlinear component in response to any input and the tuning curve for each nonlinear component is generated randomly.

40. The adaptive filter of claim 23, wherein the output modifier generated by at least one of the adaptive sub-modules is multidimensional.

41. The adaptive filter of claim 40, wherein at least one of the nonlinear components in the adaptive sub-module that generates the multidimensional output modifier is coupled to the output module by a plurality of weighted couplings, one weighted coupling for each dimension of the multidimensional output modifier.

42. The adaptive filter of claim 41, wherein each of the nonlinear components in the adaptive sub-module that generates the multidimensional output modifier is coupled to the output module by a plurality of weighted couplings, one weighted coupling for each dimension of the multidimensional output modifier.

* * * * *